(12) United States Patent
Pineo et al.

(10) Patent No.: US 7,854,256 B2
(45) Date of Patent: Dec. 21, 2010

(54) PLUG BYPASS VALVES AND HEAT EXCHANGERS

(75) Inventors: Gregory Merle Pineo, Kleinburg (CA); Brian E. Cheadle, Brampton (CA); Yuri Peric, Split (HR)

(73) Assignee: Dana Canada Corporation, Oakville (CA)

( * ) Notice: Subject to any disclaimer, the term of this patent is extended or adjusted under 35 U.S.C. 154(b) by 1 day.

(21) Appl. No.: 12/335,024

(22) Filed: Dec. 15, 2008

(65) Prior Publication Data

US 2009/0229812 A1 Sep. 17, 2009

Related U.S. Application Data

(63) Continuation-in-part of application No. 11/264,494, filed on Nov. 1, 2005, now Pat. No. 7,487,826, which is a continuation-in-part of application No. 09/918,082, filed on Jul. 30, 2001, now abandoned.

(30) Foreign Application Priority Data

Jul. 26, 2001 (CA) ................................. 2354217

(51) Int. Cl.
*G05D 23/00* (2006.01)
(52) U.S. Cl. .................. 165/297; 165/101; 165/103; 165/173; 165/296
(58) Field of Classification Search ............ 165/101, 165/103, 153, 173, 296, 297; 137/597, 630.19, 137/630.22
See application file for complete search history.

(56) References Cited

U.S. PATENT DOCUMENTS

| 208,986 | A | 10/1878 | Patterson |
|---|---|---|---|
| 290,450 | A | 12/1883 | Medden |
| 320,280 | A | 6/1885 | Pearson |
| 417,136 | A | 12/1889 | Bell |
| 424,199 | A | 3/1890 | Haskell |
| 674,674 | A | 5/1901 | Fernald |
| 809,603 | A | 1/1906 | Barr |
| 967,820 | A | 8/1910 | Nchtigall |
| 1,457,937 | A | 6/1923 | Reynolds |
| 1,648,124 | A | 11/1927 | Hopkins |
| 1,740,420 | A | 12/1929 | Friedman |

(Continued)

OTHER PUBLICATIONS

Crane Catalogue, Section 2, Bronze Valves, pp. 2-27 and 2-29, May 1961.

(Continued)

*Primary Examiner*—Ljiljana (Lil) V Ciric
(74) *Attorney, Agent, or Firm*—Marshall & Melhorn LLC

(57) ABSTRACT

A bypass valve for a heat exchanger including a plurality of parallel tubular members comprises a housing having a hollow plug portion adjacent to an actuator portion. The actuator comprises a reciprocating plunger extending into the plug portion and a solenoid having a central actuator shaft attached to the plunger, wherein the actuator shaft extends upon energization of the solenoid so that the plunger prevents bypass flow through the valve. The valve also comprises a temperature sensor for sensing a temperature of the fluid flowing through the heat exchanger, the temperature sensor being electrically coupled to the solenoid through one or more conductors, wherein the temperature sensor is located at the first end of the actuator shaft and the conductors extend through the hollow interior of the actuator shaft to the second end thereof.

8 Claims, 17 Drawing Sheets

U.S. PATENT DOCUMENTS

| | | | |
|---|---|---|---|
| 1,807,594 A | 6/1931 | Hopkins | |
| 1,843,953 A | 2/1932 | McKinney | |
| 1,937,246 A | 11/1933 | Reedy | |
| 1,939,128 A | 12/1933 | Meyer | |
| 1,942,417 A | 1/1934 | Ferlin | |
| 1,991,052 A | 2/1935 | Derby | |
| 2,159,468 A | 5/1939 | Young et al. | |
| 2,396,053 A | 3/1946 | McEntire | |
| 2,433,454 A | 12/1947 | Hoffman | |
| 2,469,212 A | 5/1949 | Shaw | |
| 2,865,594 A | 12/1958 | Winfree | |
| 3,034,571 A | 5/1962 | Matthews | |
| 3,145,968 A | 8/1964 | Marx | |
| 3,155,367 A | 11/1964 | Gifford | |
| 3,282,554 A | 11/1966 | Jones | |
| 3,404,837 A | 10/1968 | James | |
| 3,412,756 A | 11/1968 | Shore | |
| 3,414,232 A | 12/1968 | Hellman | |
| 3,440,833 A | 4/1969 | Fernandes | |
| 3,519,245 A | 7/1970 | Hyde | |
| 3,558,098 A | 1/1971 | Puster | |
| 3,572,631 A | 3/1971 | Ritchart | |
| 3,754,706 A | 8/1973 | Tao | |
| 3,779,306 A | 12/1973 | Wilson | |
| 3,926,204 A | 12/1975 | Earl | |
| 3,943,970 A | 3/1976 | Knapp | |
| 3,952,764 A | 4/1976 | Keller, III | |
| 4,024,909 A | 5/1977 | Hofmann, Jr. | |
| 4,056,119 A | 11/1977 | Allen | |
| 4,089,504 A | 5/1978 | Giuliani | |
| 4,114,571 A | 9/1978 | Ruf | |
| 4,469,275 A | 9/1984 | DeSalve | |
| 4,508,132 A | 4/1985 | Mayfield et al. | |
| 4,527,681 A | 7/1985 | Sommer | |
| 4,550,896 A | 11/1985 | Hansen, III | |
| 4,574,836 A | 3/1986 | Barnard, Jr. | |
| 4,669,532 A | 6/1987 | Tejima et al. | |
| 4,759,331 A | 7/1988 | Sausner | |
| 4,846,219 A | 7/1989 | Schaefer | |
| 5,085,468 A | 2/1992 | Billotte | |
| 5,108,071 A | 4/1992 | Hutchings | |
| 5,217,200 A | 6/1993 | Hutchings | |
| 5,303,734 A | 4/1994 | Eidsmore | |
| 5,401,087 A | 3/1995 | Goossens | |
| 5,423,373 A | 6/1995 | Ramberg | |
| 5,425,397 A | 6/1995 | Mackal | |
| 5,474,107 A | 12/1995 | Hayes | |
| 5,551,506 A | 9/1996 | Nishishita | |
| 5,553,664 A | 9/1996 | Nishishita et al. | |
| 5,609,203 A | 3/1997 | Kinugasa et al. | |
| 5,687,756 A | 11/1997 | VanNatta | |
| 5,694,975 A | 12/1997 | Eidsmore | |
| 5,875,834 A | 3/1999 | Brooks | |
| 5,904,292 A | 5/1999 | McIntosh | |
| 5,964,282 A | 10/1999 | Seiler et al. | |
| 5,988,265 A | 11/1999 | Marthaler | |
| 6,161,614 A | 12/2000 | Woodhull, Jr. et al. | |
| 6,253,837 B1 | 7/2001 | Seiler et al. | |
| 6,302,191 B1 | 10/2001 | Wickham et al. | |
| 6,505,812 B1 | 1/2003 | Anastas | |
| 6,533,242 B2 | 3/2003 | Geib | |
| 6,659,050 B1 | 12/2003 | Creech | |
| 6,772,958 B1 | 8/2004 | Lamb et al. | |
| 6,793,198 B2 | 9/2004 | Robison | |
| 6,810,931 B2 | 11/2004 | Graffin | |
| 6,886,597 B2 | 5/2005 | Dragoni et al. | |
| 7,178,553 B2 | 2/2007 | Peric et al. | |
| 7,487,826 B2 * | 2/2009 | Pineo et al. | 165/297 |
| 2003/0019620 A1 | 1/2003 | Pineo et al. | |
| 2003/0062493 A1 | 4/2003 | Lin | |
| 2003/0197142 A1 | 10/2003 | Tawns | |

OTHER PUBLICATIONS

ISA Handbook of Control Valves, 2nd Edition, pp. 14-15, Jun. 1, 1976.
Parker Fluid Connectors, Rising Stem Plug Valve, p. 13, Jul. 1994.

\* cited by examiner

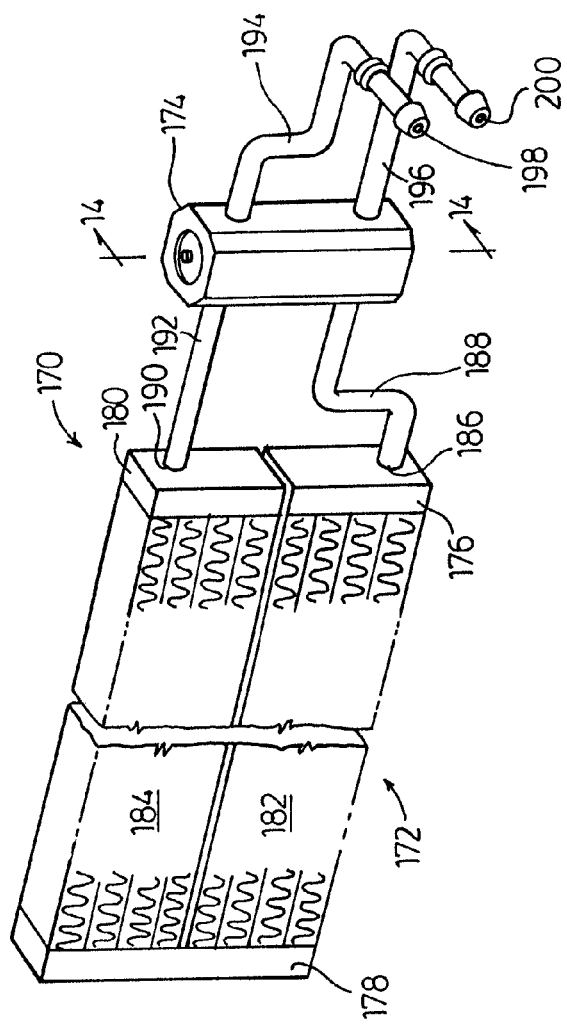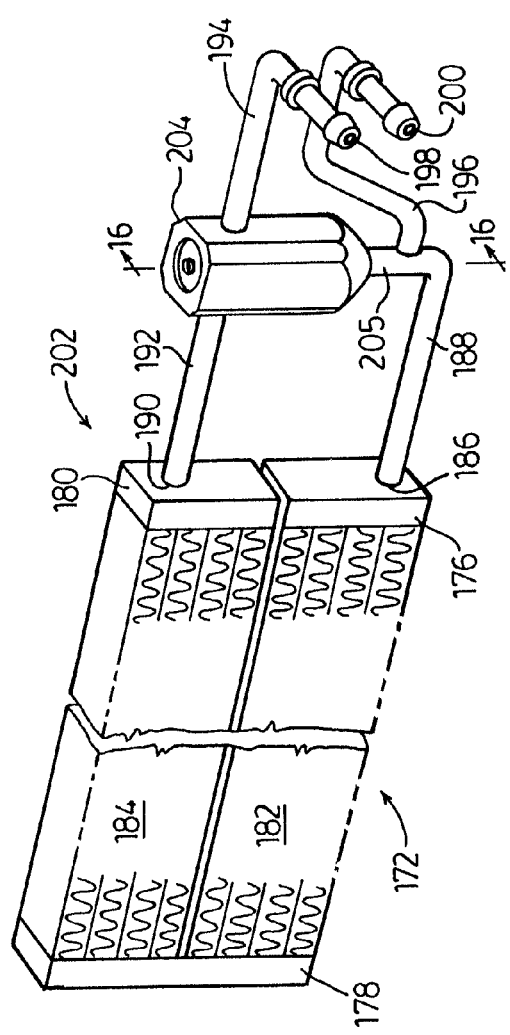

PLUG BYPASS VALVES AND HEAT EXCHANGERS

CROSS-REFERENCE TO RELATED APPLICATIONS

This is a continuation-in-part of U.S. patent application Ser. No. 11/264,494, filed Nov. 1, 2005, now issued as U.S. Pat. No. 7,487,826; which is a continuation of U.S. patent application Ser. No. 09/918,082, filed Jul. 30, 2001, now abandoned; both of which are incorporated herein by reference in their entireties.

FIELD OF THE INVENTION

This invention relates to heat exchangers, and in particular, to bypass valves for bypassing or short-circuiting flow from the heat exchanger inlet to the heat exchanger outlet under conditions where the heat transfer function of the heat exchanger is not required or is only intermittently required.

BACKGROUND OF THE INVENTION

In certain applications, such as in the automotive industry, heat exchangers are used to cool or heat certain fluids, such as engine oil or transmission fluid or oil. In the case of transmission fluid, for instance, a heat exchanger is usually used to cool the transmission fluid. The heat exchanger is usually located remote from the transmission and receives hot transmission fluid from the transmission through supply tubing, cools it, and delivers it back to the transmission again through return tubing. However, when the transmission is cold, such as at start-up conditions, the transmission oil is very viscous and does not flow easily through the heat exchanger, if at all. In such cases, the transmission can be starved of fluid and this may cause damage to the transmission or at least erratic performance. Damage can also be caused to the transmission if the quantity of fluid returned is adequate, but is over-cooled by the heat exchanger due to low ambient temperatures. In this case, water may accumulate in the transmission fluid as a result of condensation (which normally would be vaporized at higher temperatures) and this may cause corrosion damage or transmission fluid degradation.

In order to overcome the cold flow starvation problem, it has been proposed to insert a bypass valve between the supply and return tubing to and from the heat exchanger. This bypass valve may be temperature responsive so that it opens causing bypass flow when the transmission fluid is cold, and it closes to prevent bypass flow when the transmission fluid heats up to operating temperature. An example of such a bypass valve is shown in U.S. Pat. No. 6,253,837 issued to Thomas F. Seiler et al. While this approach works satisfactorily, the heat exchanger and bypass valve assembly becomes quite large and includes fluid inlet and outlet tubing that may not otherwise be required.

SUMMARY OF THE INVENTION

In the present invention, the bypass valve can be incorporated as an integral part of the heat exchanger as a plug-in item that can be located anywhere desired between the inlet and outlet flow manifolds of the heat exchanger.

According to one aspect of the invention, there is provided a bypass valve for a heat exchanger including a plurality of parallel, tubular members having adjacent wall portions defining flow openings in communication to form flow manifolds. The bypass valve comprises a housing having a hollow plug portion with opposed plug walls defining inlet and outlet openings therein, the plug walls being adapted to be sealingly mounted between selected adjacent tubular member wall portions to allow fluid flow respectively between the flow manifolds and the inlet and outlet openings. The housing also has an actuator portion located adjacent to the plug portion. Also, an actuator is releasably mounted in the actuator portion and has a reciprocating plunger extending into the plug portion to block and unblock flow between the inlet and outlet openings.

According to another aspect of the invention, there is provided a heat exchanger comprising a plurality of parallel, tubular members having adjacent wall portions defining flow openings in communication to form inlet and outlet manifolds for the flow of fluid through the tubular members. A bypass valve includes a housing having a hollow plug portion with opposed plug walls defining inlet and outlet openings therein, the plug walls being sealingly mounted between selected adjacent tubular member wall portions to allow fluid flow respectively between the flow manifolds and the inlet and outlet openings. The housing also has an actuator portion located adjacent to the plug portion. Also, an actuator is releasably mounted in the actuator portion and has a reciprocating plunger extending into the plug portion to block and unblock flow between the inlet and outlet openings.

According to yet another aspect of the invention, there is provided a bypass valve for a heat exchanger including a plurality of parallel tubular members having adjacent wall portions defining flow openings in communication to form flow manifolds. The bypass valve comprises a housing having a hollow plug portion with opposed plug walls defining inlet and outlet openings therein. The plug walls are adapted to be sealingly mounted between selected adjacent tubular member wall portions to allow fluid flow respectively between said flow manifolds and said inlet and outlet openings. The housing also has an actuator portion located adjacent to the plug portion. An actuator is releasably mounted in the actuator portion and comprises a reciprocating plunger extending into the plug portion and a solenoid having a central actuator shaft attached to the plunger. The actuator shaft extends upon energization of the solenoid, so that the plunger blocks flow between the inlet and outlet openings. The actuator shaft has a first end to which the plunger is attached, a second end, and a hollow interior, and the actuator further comprises bias means for urging the actuator shaft to retract upon de-energization of the solenoid so as to unblock flow between said inlet and outlet openings. A temperature sensor is provided for sensing a temperature of the fluid flowing through the heat exchanger. The temperature sensor is electrically coupled to the solenoid through one or more conductors, wherein the temperature sensor is located at the first end of the actuator shaft and the one or more conductors extend through the hollow interior of the actuator shaft to the second end thereof.

According to yet another aspect of the invention, there is provided a heat exchanger comprising a plurality of parallel, tubular members having adjacent wall portions defining flow openings in communication to form inlet and outlet manifolds for the flow of fluid through the tubular members, wherein the heat exchanger includes a bypass valve according to the invention.

According to yet another aspect of the invention, there is provided a bypass valve for a heat exchanger. The bypass valve comprises a housing and a temperature-responsive actuator mounted in the housing. The housing comprises a first opening and a second opening to permit fluid to flow through the valve; a first valve chamber which is arranged between the first and second openings and is in flow communication with both the first and second openings; a second valve chamber in flow communication with the first valve chamber; a third opening in communication with the second valve chamber; and a valve port which is arranged between the first and second valve chambers, wherein the second valve chamber is arranged between the third opening and the valve port. The temperature-responsive actuator comprises a reciprocating sealing member extending into the first valve chamber; a solenoid having a central actuator shaft attached to the sealing member, wherein the actuator shaft extends upon energization of the solenoid, so that the sealing member seals the valve port and blocks flow between the first and second valve chambers, wherein the actuator shaft has a first end to which the sealing member is attached, a second end, and a hollow interior; bias means for urging the actuator shaft to retract upon de-energization of the solenoid so as to unblock flow between said inlet and outlet openings; and a temperature sensor for sensing a temperature of the fluid flowing through the valve, the temperature sensor being electrically coupled to the solenoid through one or more conductors, wherein the temperature sensor is located at the first end of the actuator shaft and the one or more conductors extend through the hollow interior of the actuator shaft to the second end thereof.

BRIEF DESCRIPTION OF THE DRAWINGS

Preferred embodiments of the invention will now be described by way of example, with reference to the accompanying drawings, in which:

FIG. 12 is a schematic view of a heat exchange circuit including a heat exchanger and a four-port bypass valve according to the present invention;

FIG. 13 is a schematic view of a heat exchange circuit including a heat exchanger and a three-port bypass valve according to the present invention;

DETAILED DESCRIPTION

Figure 1:
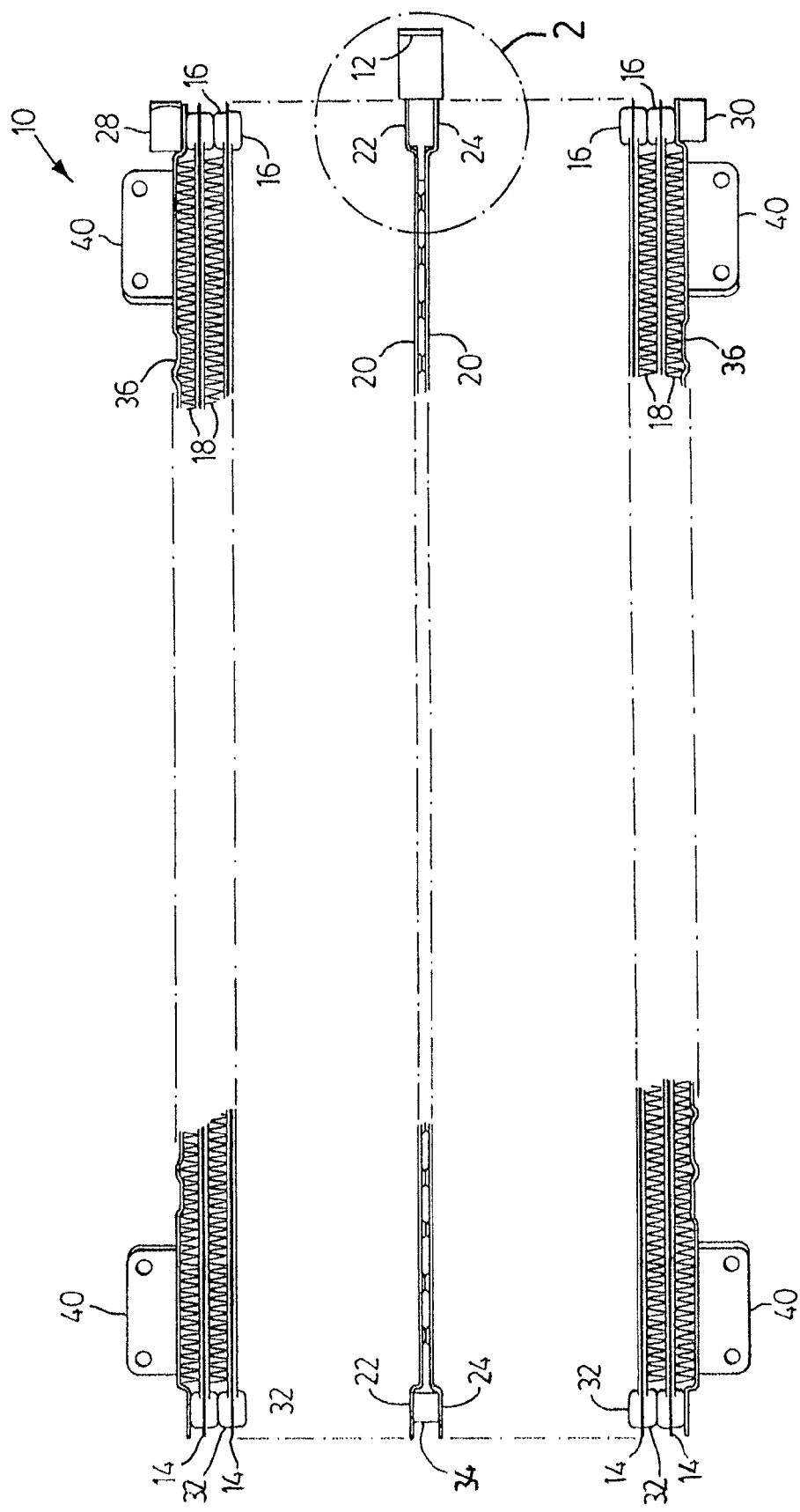
FIG. 1 is an elevational view of a heat exchanger having a preferred embodiment of a bypass valve according to the present invention mounted therein.
Figure 2:
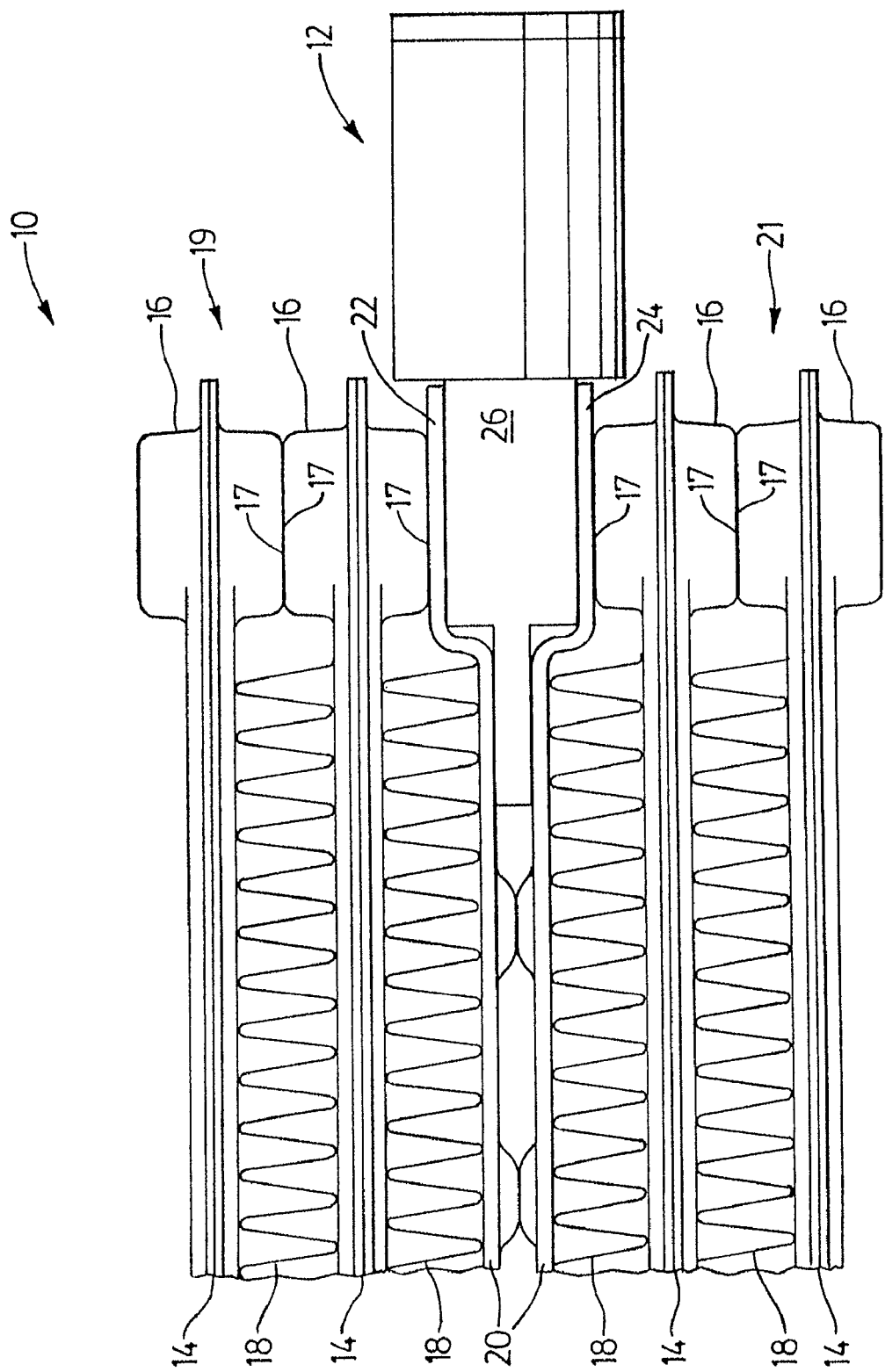
FIG. 2 is an enlarged view of the portion of FIG. 1 indicated by circle 2.

Referring first to FIGS. 1 and 2, a heat exchanger is generally indicated by reference numeral 10, and a preferred embodiment of a bypass valve according to the present invention is generally indicated by reference numeral 12. Heat exchanger 10 is formed of a plurality of parallel, spaced-apart, tubular members 14 preferably with enlarged distal end portions 16 that have adjacent wall portions 17 defining flow openings (not shown) in communication. Tubular members 14 are preferably formed of mating plate pairs with transversely protruding cupped end portions to form these enlarged end portions 16 that also together form flow manifolds 19 and 21. However, tubular members 14 could be formed of tubes with separate joined enlarged end portions 16, if desired. Alternatively, tubular members of uniform width or thickness could be used, in which case tubular spacers could be used between the tube ends in place of enlarged distal end portions 16. If it is not necessary to space tubular members 14 apart transversely, then such spacers would not be required. Yet another possibility would be to use transversely orientated tubular manifolds 19 and 21 attached in communication with the ends of tubular members 14. For the purpose of this disclosure, the term "distal end portions" is intended to include all of the above-mentioned tube member communicating wall structures. Corrugated cooling fins 18 are located between the tubular members 14 where the tubular members 14 are spaced apart transversely.

In the heat exchangers shown in FIGS. 1 and 2, the tubular members 14 are formed into two upper and lower groups separated by central back-to-back dimpled plates 20 having offset end portions 22, 24. As seen best in FIG. 2, the space between offset end portions 22, 24 provides a location where bypass valve 12 can be plugged into heat exchanger 10. Bypass valve 12 includes a hollow plug portion 26 located in this space, and which will be described in further detail below.

As mentioned above, the enlarged distal end portions 16 have transverse openings therethrough (not shown), so that the distal end portions 16 located above bypass valve 12 are all in communication and form either an inlet or an outlet manifold 19 depending on the direction in which fluid is to flow through heat exchanger 10. Similarly, the enlarged distal end portions 16 located below bypass valve 12 are all in communication and form a respective outlet or inlet manifold 21. As seen best in FIG. 1, an inlet or outlet fitting 28 communicates with the enlarged distal end portions below it and an inlet or outlet fitting 30 communicates with the enlarged distal end portions above it. So, for example, fluid entering inlet fitting 28 travels from right to left as shown in FIG. 1 through all of the tubular members 14 located above dimpled plates 20, to a similar left hand manifold formed by enlarged distal end portions 32, and then downwardly through a crossover fitting 34 into a left hand manifold in the lower section of heat exchanger 10 formed by enlarged distal end portions 32, and then back to the right end and out through outlet fitting 30.

Heat exchanger 10 is thus called a two-pass heat exchanger and can have any number of tubular members 14 above or below the dimpled plates 20. In fact, there could just be one tubular member 14 above or below dimpled plates 20, as illustrated in the embodiment shown in FIG. 9 and as described further below.

Heat exchanger 10 also has upper and lower dimpled plates 36. Suitable mounting brackets 40 are attached to dimpled plates 36 as are the inlet and outlet fittings 28, 30.

Figure 3:
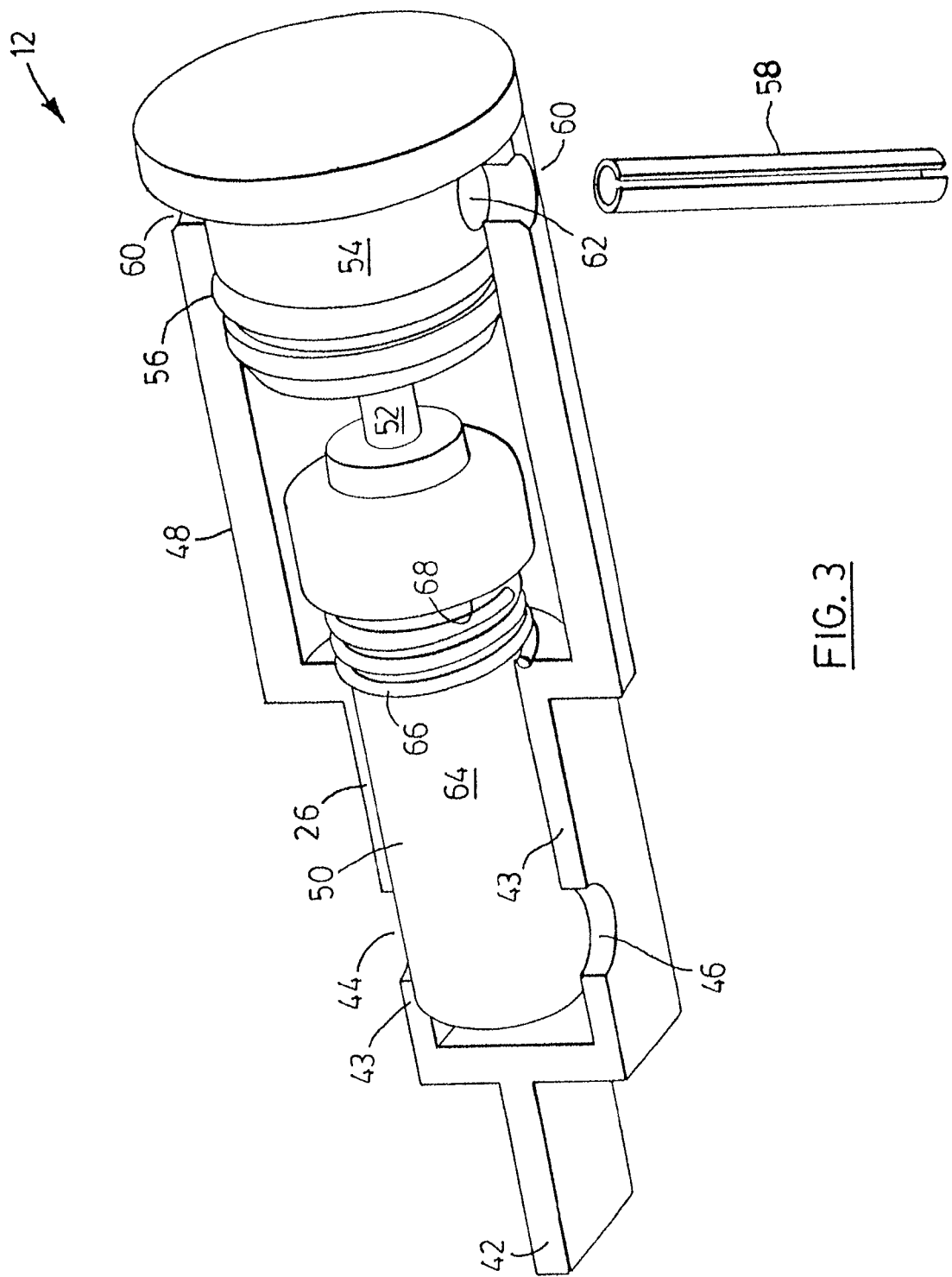
FIG. 3 is a perspective view, partly broken away of the bypass valve of FIG. 2 shown in the closed position.
Figure 4:
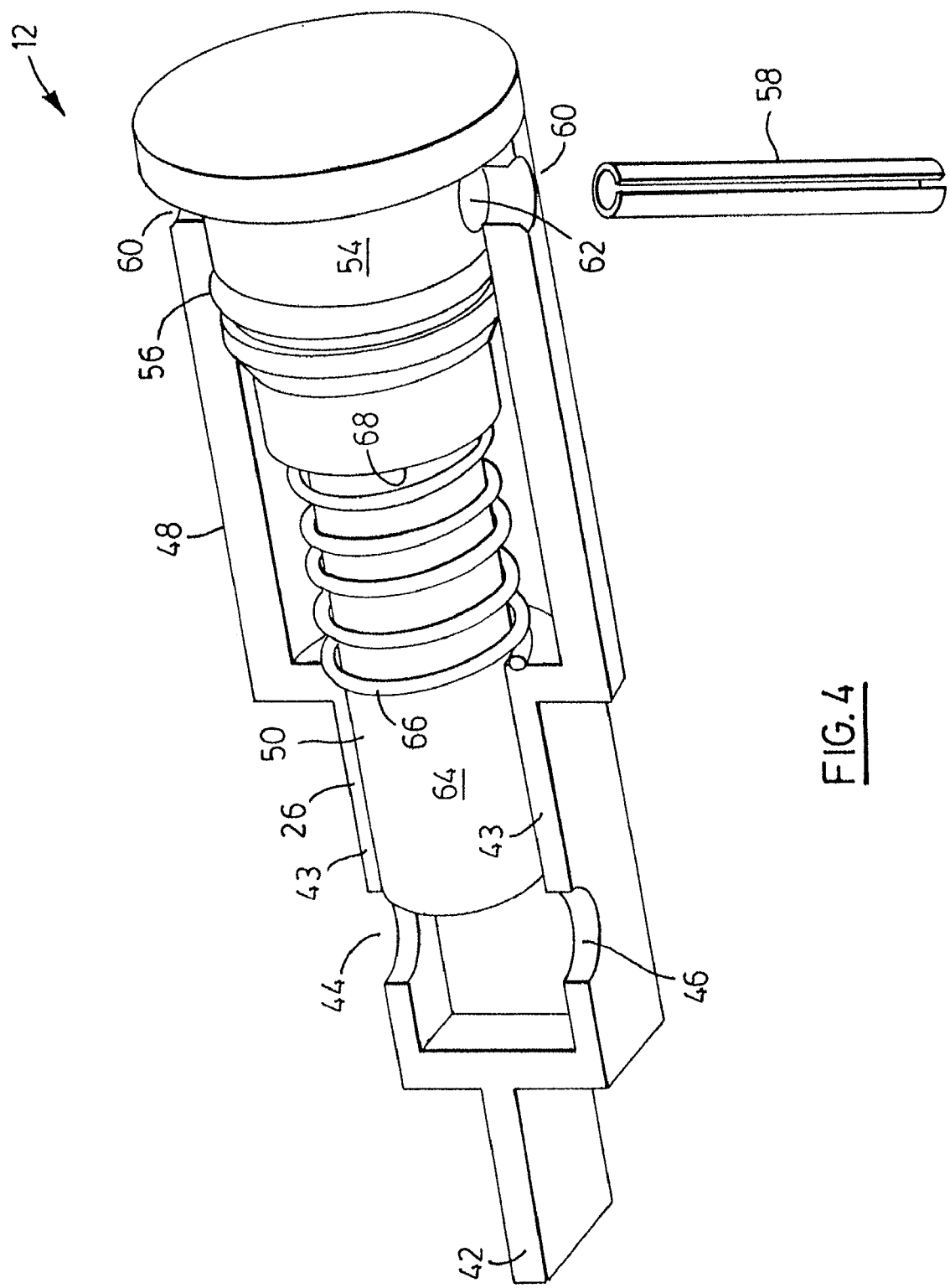
FIG. 4 is a perspective view similar to FIG. 3 but showing the bypass valve in the open position.

Referring next to FIGS. 3 and 4, bypass valve 12 includes a housing 42 having a hollow plug portion 26 with spaced-apart, opposed, flat, parallel plug side walls 43 defining transversely located inlet and outlet openings 44, 46 formed therein for the flow of fluid through plug portion 26 when valve 12 is in the open position as shown in FIG. 4. Plug walls 43 are sealingly mounted between selected adjacent tubular member wall portions 17 of the enlarged distal end portions 16 of tubular members 14. The distal end portions 16 have flat mating surfaces. The offset end portions 22 mate flush against their adjacent distal end portion flat surfaces and the flat housing side walls 43 mate flush against the flat offset end portions 22. However, housing side or plug walls 43 would mate flush against the flat portions of distal end portions 16, if dimpled plates 22 were not used in heat exchanger 10. This mounting allows bypass fluid flow directly between selected distal end portions 16, or respectively between the flow manifolds 19 and 21 and the inlet and outlet openings 44 and 46, or between the inlet and outlet fittings 28, 30 when bypass valve 12 is open. Bypass valve side or plug walls 43 are spaced apart a predetermined distance so as to determine the spacing between adjacent heat exchanger tubular members, especially if dimpled plates 20 are not used.

Bypass valve housing 42 also has an actuator portion 48 located adjacent to and communicating with plug portion 26. A temperature responsive actuator 50 is located in housing 42. Actuator 50 has a central shaft 52 attached to a removable closure 54 located remote from plug portion 26. Removable closure 54 has an O-ring seal 56 and is held in position by a split pin 58 passing through openings 60 in housing actuator portion 40 and a through hole 62 in closure 54.

Temperature responsive actuator 50 has a reciprocating barrel portion 64 which forms a plunger slidably located in housing plug portion 26 to block and unblock flow between inlet and outlet openings 44, 46. A spring 66 is located in housing actuator portion 48 and bears against an annular shoulder 68 on barrel 64 to act as bias means to urge the actuator 50 to retract so that barrel or plunger 64 unblocks the flow of fluid through inlet and outlet openings 44, 46 of bypass valve 12, when the actuator is not extended due to temperature, as described next below.

Temperature responsive actuator 50 is sometimes referred to as a thermal motor and it is a piston and cylinder type device. Barrel or plunger 64 is filled with a thermal sensitive material, such as wax, that expands and contracts, causing the actuator to extend axially upon being heated to a predetermined temperature and to retract upon being cooled below this predetermined temperature. Where bypass valve 12 is used in conjunction with an automotive transmission fluid or oil cooler, this predetermined temperature is about 80 degrees Celsius, which is the temperature of the fluid from the transmission when bypass flow is no longer required.

Figure 5:
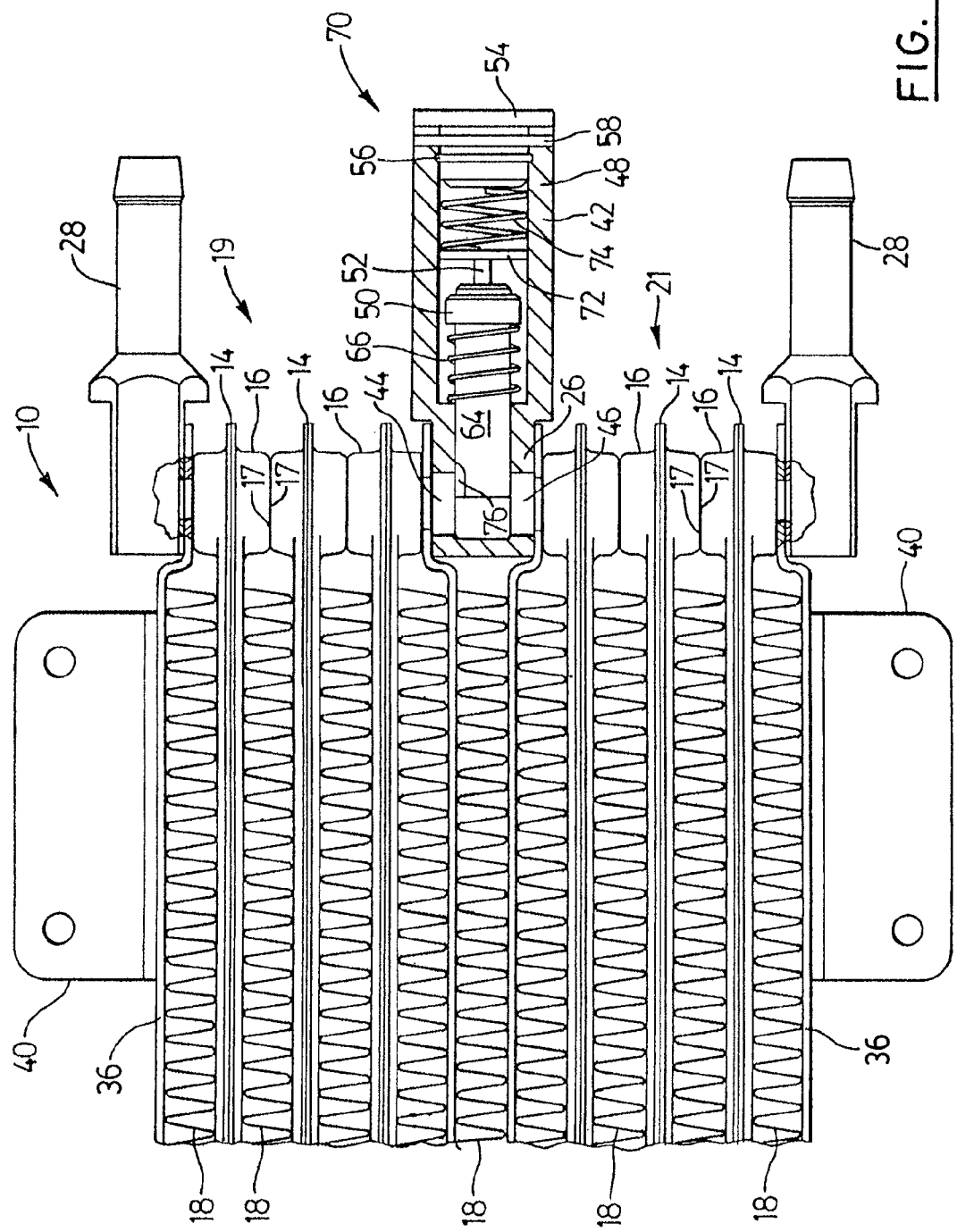
FIG. 5 is an elevational view similar to FIG. 2, but showing another preferred embodiment of a bypass valve according to the present invention, the valve being shown partially in cross-section.

Referring next to FIG. 5, another preferred embodiment of a bypass valve according to the present invention is generally indicated by reference numeral 70. Bypass valve 70 is similar to bypass valve 12 except that a sliding plate 72 bears against central shaft 52 and a spring 74 is located in housing actuator portion 48 to urge central shaft 52 toward the housing plug portion 26. Spring 74 absorbs any pressure spikes or peaks that may occur in the inlet and outlet manifolds of heat exchanger 10. A notch 76 is formed in barrel 64 to allow the fluid to act against the end of barrel 64 and provide this pressure relief even when bypass valve 70 is closed. A bleed hole through plunger or barrel 64 communicating with inlet opening 44 could also be used in place of notch 76 for this purpose. Otherwise, bypass valve 70 is substantially the same as bypass valve 12.

Figure 6:
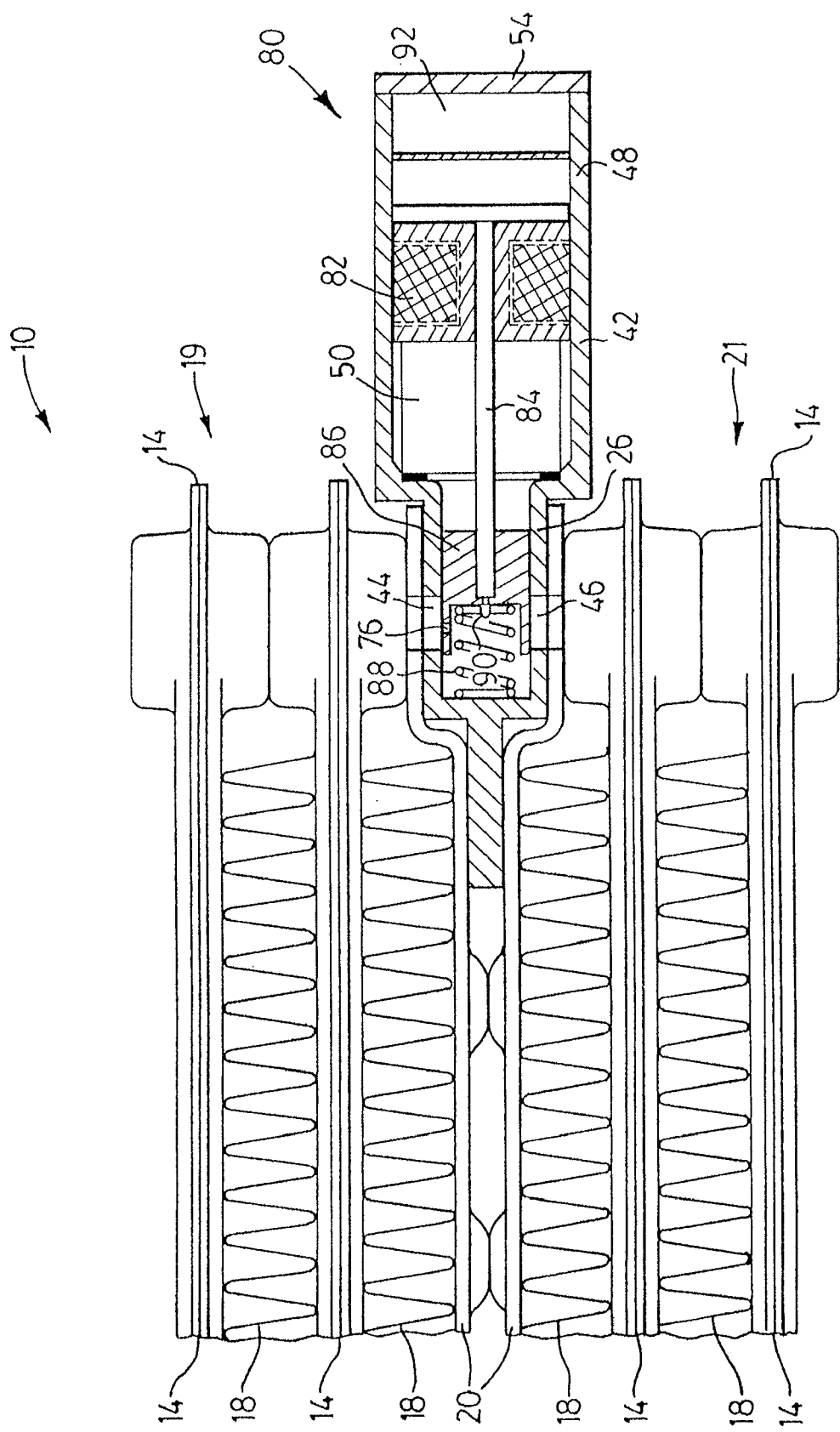
FIG. 6 is an elevational view similar to FIG. 2, showing yet another preferred embodiment of a bypass valve according to the present invention, the valve being shown in cross-section and in the closed position.
Figure 7:
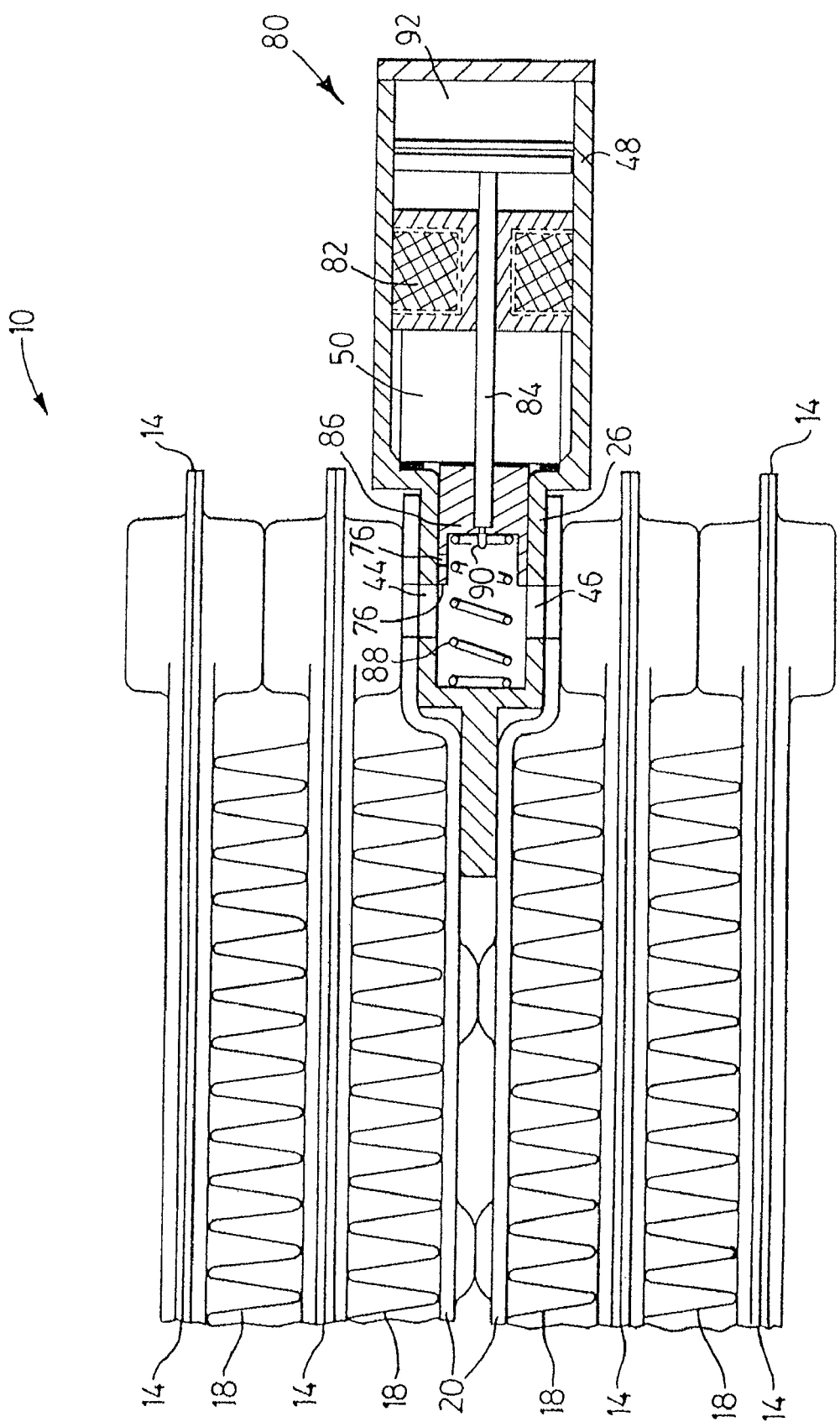
FIG. 7 is an elevational view similar to FIG. 6, but showing the bypass valve of FIG. 6 in the open position.

Referring next to FIGS. 6 and 7, another preferred embodiment of a bypass valve according to the present invention is generally indicated by reference numeral 80. In bypass valve 80, the temperature responsive actuator 50 includes a solenoid having a solenoid coil 82 and a central actuator shaft 84 attached to a plunger 86. Plunger 86 also has a notch or bleed hole 76 to provide pressure spike relief when valve 80 is closed. Actuator shaft 84 extends upon energization of solenoid coil 82, so that plunger 86 blocks flow between the housing inlet and outlet openings 44, 46. A spring 88 located in housing plug portion 26 bears against plunger 86 to act as bias means for urging the actuator shaft 84 to retract when solenoid coil 82 is de-energized.

A temperature sensor 90 is attached to plunger 86 and is in the form of a thermistor electrically coupled to solenoid coil 82 for actuation of the solenoid coil when the temperature of the fluid going through heat exchanger 10 reaches a predetermined temperature. Temperature sensor 90 could be located elsewhere in bypass valve 80, or even elsewhere in heat exchanger 10. Preferably, temperature sensor 90 is electrically connected to an electrical control unit 92 mounted in housing actuator portion 48. Electrical control unit 92 is in turn electrically connected to solenoid coil 82 for controlling the movement of plunger 86 in accordance with the temperature sensed by temperature sensor 90. In this way, the opening of bypass valve 80 could be controlled to provide variable opening, rather than a simple on or off, but the latter is also possible.

Figure 8:
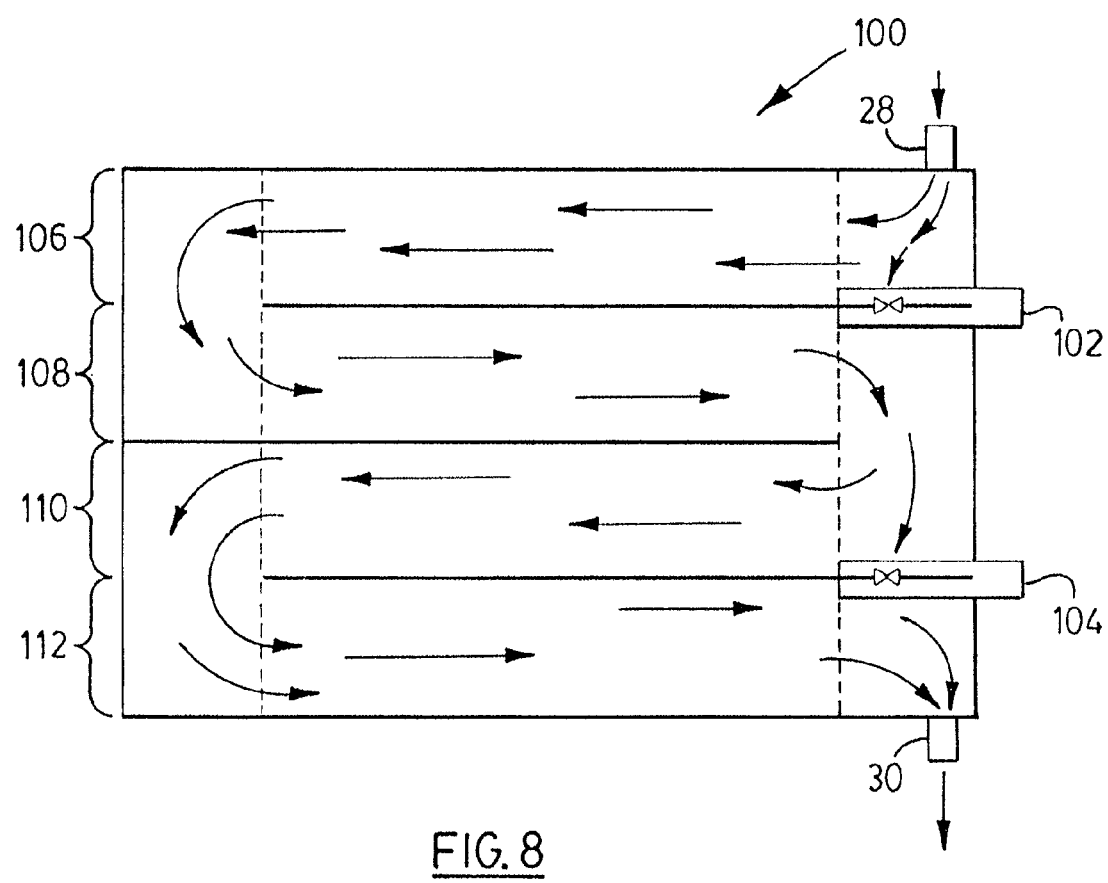
FIG. 8 is a schematic view of a heat exchanger having multiple passes and more than one bypass valve.

Referring next to FIG. 8, a heat exchanger 100 is shown schematically and it is like two heat exchangers 10 of FIG. 1 mounted in series. Two bypass valves 102, 104 are used to provide thermal modulation of the fluid flowing through the heat exchanger 100. Bypass valve 102 may have a predetermined temperature set point or activation temperature, and bypass valve 104 may have a somewhat higher temperature set point or activation temperature. Heat exchanger 100 is a four pass heat exchanger having four groups or stacks 106, 108, 110 and 112 of tubular members.

Where both bypass valves 102 and 104 are open, such as during cold flow operation, there is full fluid bypass from inlet fitting 28 to outlet fitting 30. Where bypass valve 102 is closed and valve 104 is open, such as during warm up or an interim temperature of fluid flowing through heat exchanger 100, there would be fluid flow through the top two passes 106 and 108 of heat exchanger 100, but passes 110 and 112 would be bypassed through bypass valve 104. Where the fluid reaches its hot operating temperature, both bypass valves 102 and 104 would close giving flow through all four passes 106, 108, 110 and 112 and no bypass flow at all. Additional multiples of passes and bypass valves could be used in a single heat exchanger as well. Any of the types of bypass valves described above could be used in heat exchanger 100.

Figure 9:
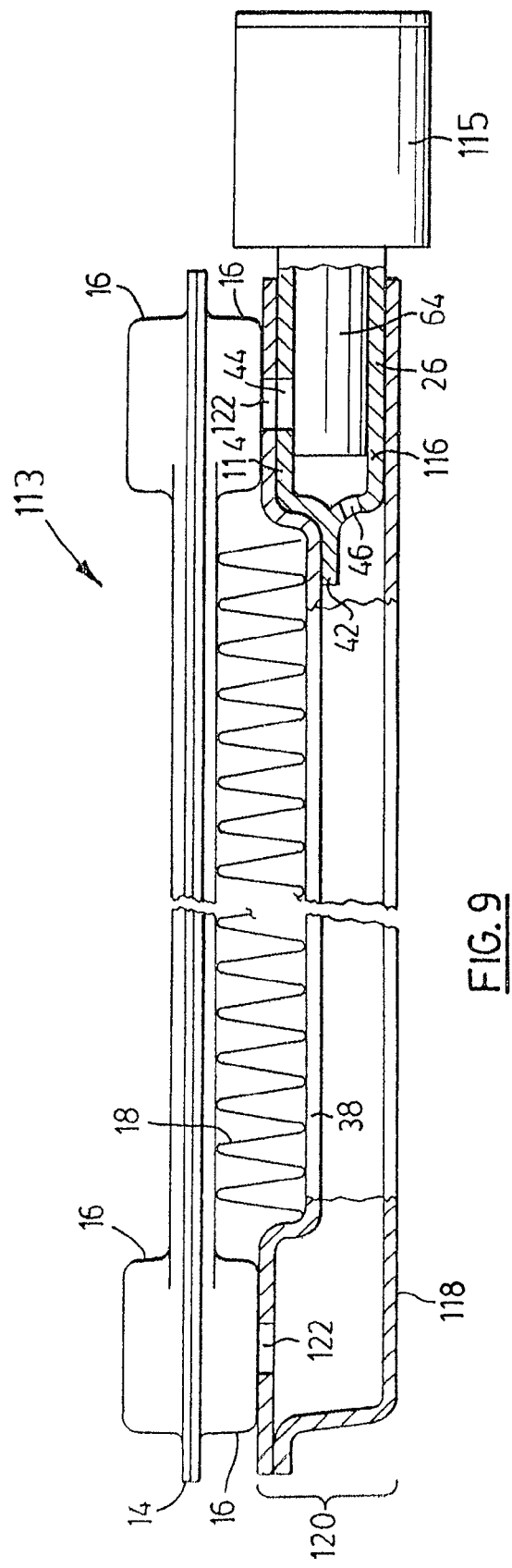
FIG. 9 is an elevational view of a portion of another preferred embodiment of a heat exchanger and bypass valve according to the present invention.

Referring next to FIG. 9, other preferred embodiments of a heat exchanger 113 and a bypass valve 115 are shown. In bypass valve 115, inlet and outlet openings 44, 46 are formed in opposed plug walls 114, 116 and this shows that inlet and outlet openings 44, 46 can be located anywhere in plug portion 26 as long as one of these openings is blocked when valve 115 is closed. Otherwise, bypass valve 115 is substantially similar to or can incorporate the features of the bypass valves 12, 70 and 80 described above. In the embodiment of FIG. 9, plate 36 (which preferably is dimpled but may be flat) and a bottom plate 118 (which may also be dimpled or flat), together form a tubular member 120 which is one of the tubular members that make up heat exchanger 113. Tubular member 120 is actually a bypass channel and has flow openings 122 that communicate with the flow openings in the adjacent enlarged distal end portions 16 of adjacent tubular member 14, and as such forms part of the inlet and outlet manifolds of heat exchanger 113. Instead of tubular member 120, a regular tubular member 14 could be used in heat exchanger 113, if desired. This would produce a full flood or single pass heat exchanger. Tubular members 14 may or may not have turbulizers in them or be made of dimpled plates, but the bottom tubular member 120 likely would not be turbulized or have other types of flow augmentation, such as dimples.

In the assembly of heat exchangers 10, 100 and 113, the various components, such as the tubular members 14 or 120 and fins 18 are stacked together along with dimpled plates 20, if desired, and upper and lower dimpled plates 36. Mounting plates or brackets 40 and inlet and outlet fittings 28, 30 can be preassembled to upper and lower dimpled plates 36 or assembled along with all of the other components. The housing 42 of the preferred bypass valve 12, 70, 80 or 115 (without any other bypass valve components) is then placed in the desired location in the heat exchanger and the entire assembly is brazed together in a brazing furnace. It will be appreciated that in the preferred embodiments, aluminum or a brazing-clad aluminum is used for most of the parts of the heat exchangers, so that all of the parts can be brazed together in a brazing furnace. After this assembly is cooled, the desired actuator components of the bypass valves are inserted into housing 42 and the removable closures 54 are secured in position with split pins 58.

Having described preferred embodiments of the invention, it will be appreciated that various modifications can be made to the structures described above. For example, instead of using a thermal motor or solenoid type actuator for the bypass valves, other devices could be used as well, such as a bimetallic helix to move the barrel or plunger of the valve. The tubular members can also have other shapes or configurations as well.

From the above, it will be appreciated that the bypass valves of the present invention are in the form of plugs that can be plugged in at any desired location in the heat exchanger with a simple rearrangement of the location of some components. The bypass valve housings actually act as a form of baffle plate to intermittently block flow between manifold portions of the heat exchangers. In fact, the bypass valves could be plugged in anywhere in the heat exchangers where it is desired to have bypass flow between the plate pairs or tubes. The bypass valve housings are brazed in place along with all of the other heat exchanger components. The actual valve elements in the actuators are then removably or releasably located in the bypass valve housings to complete the assembly. No external tubing or peripheral components are required to make the actuator valves active.

Figure 10:
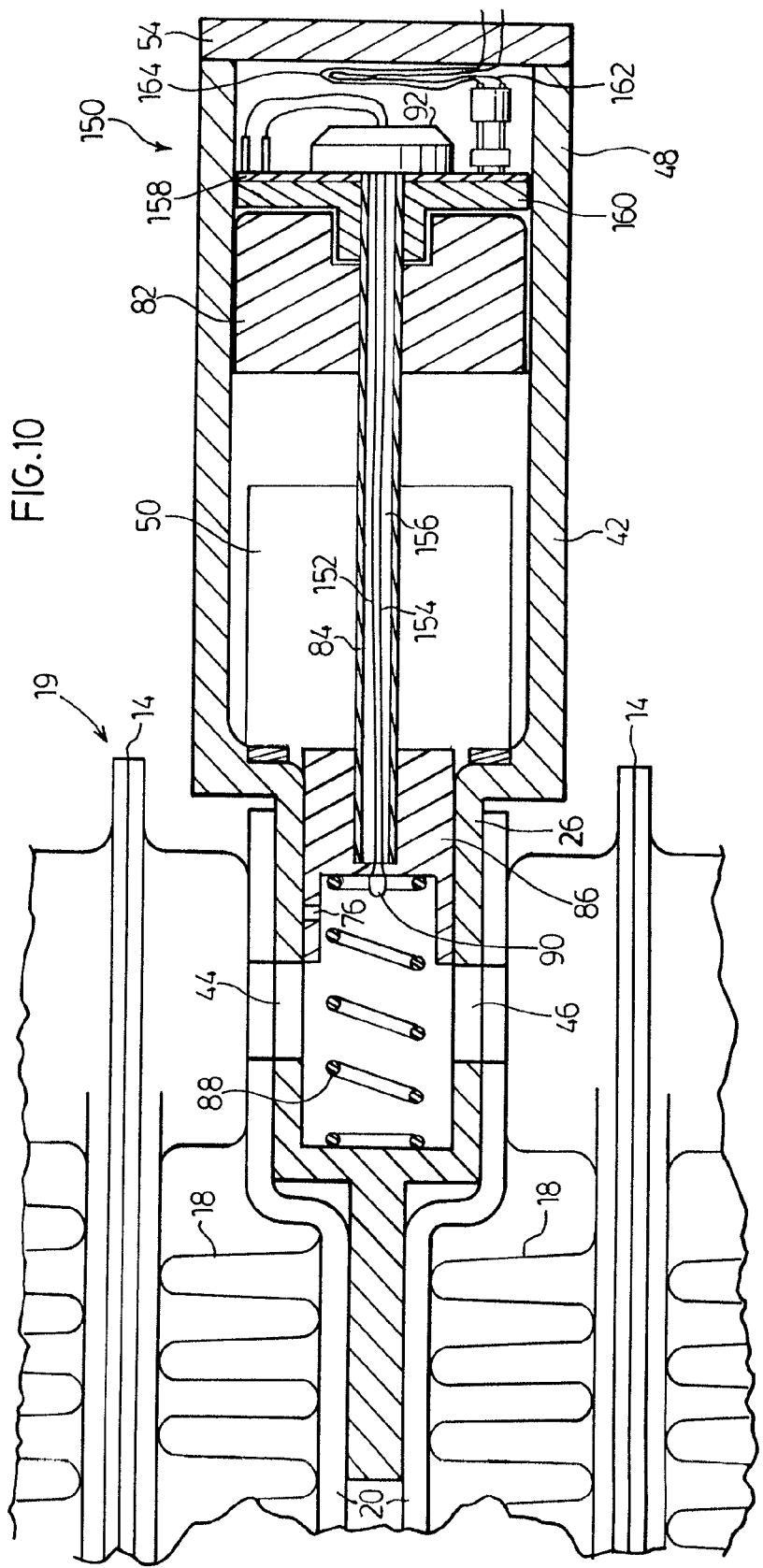
FIG. 10 is an elevational view similar to FIG. 2, partly in cross section, showing yet another preferred embodiment of a bypass valve according to the present invention, with the valve being in the open position.
Figure 11:
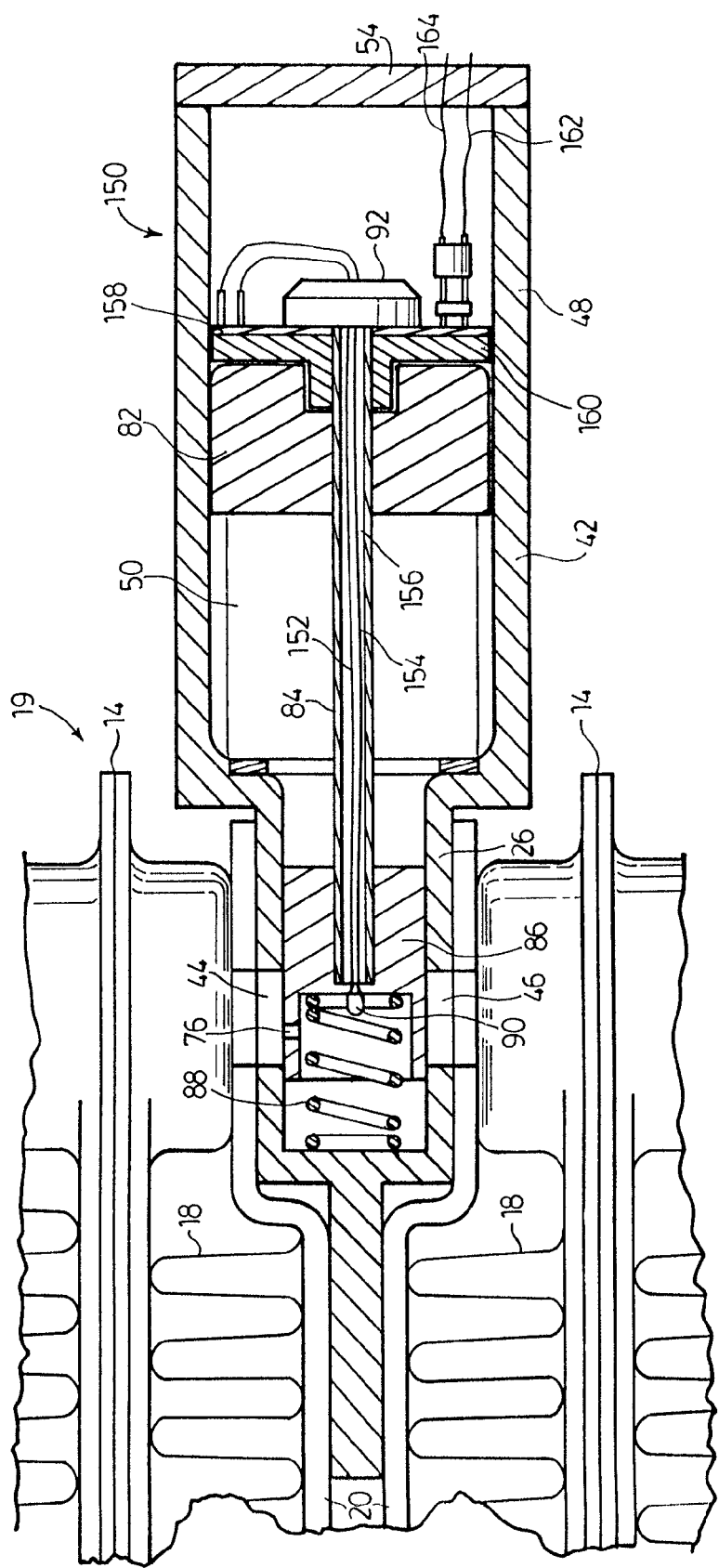
FIG. 11 is an elevational view similar to FIG. 10, but showing the bypass valve of FIG. 10 in the closed position.

FIGS. 10 and 11 illustrate a plug bypass valve 150 according to another embodiment of the invention. Valve 150 shares a number of common characteristics with the plug bypass valve 80 shown in FIGS. 6 and 7, and like components thereof are identified by like reference numerals. Bypass valve 150 includes a temperature responsive actuator 50 including a solenoid having a solenoid coil 82 and a central actuator shaft 84 attached to plunger 86. When the solenoid 82 is energized, the actuator shaft 84 is extended so as to move the plunger 86 into blocking relation with the housing inlet and outlet openings 44, 46 as shown in FIG. 11. When the solenoid 82 is de-energized, spring 88 urges the actuator shaft 84 to retract, thereby causing the plunger 86 to move out of blocking relation with openings 44, 46, thereby opening the valve as shown in FIG. 10.

Temperature sensor 90, preferably in the form of a thermistor, is attached to plunger 86 and/or the actuator shaft 84 for actuation of the solenoid coil 82 when the temperature of the fluid going through heat exchanger 10 reaches a predetermined temperature. Preferably, the temperature sensor 90 is electrically connected to an electrical control unit 92 mounted in housing actuator portion 48. More preferably, the sensor 90 is connected to the electrical control unit 92 by a pair of electrical conductors or leads 152, 154 which extend between sensor 90 and control unit 92 through the hollow interior 156 of actuator shaft 84.

In the embodiment shown in FIGS. 10 and 11, the electrical control unit 92 includes a circuit board 158 and is mounted to a solenoid plunger plate 160 having a central aperture in which one end of actuator shaft 84 is received. The sensor leads 152, 154 are connected to the circuit board 158 of control unit 92, as are the power supply leads 162, 164. The power supply leads 162, 164 extend through the housing 42 to a power supply (not shown). In the embodiment shown in the drawings, the power supply leads 162, 164 extend through the removable closure 54 of housing 42, although this is not necessarily the case. The power supply leads 162, 164 may instead extend through the side wall of actuator portion 48 of housing 42, or inbetween the actuator portion 48 and the removable closure 54. The electrical control unit 92 permits the opening of valve 150 to be controlled in order to provide variable opening, although simple on or off opening is also possible.

In operation, the temperature sensor 90 continuously monitors the temperature of the fluid flowing through heat exchanger 10. When the valve 150 is open as in FIG. 10, there is bypass flow through the valve 150, with the temperature sensor 90 communicating with the fluid as it flows through the valve 150 from inlet opening 44 to outlet opening 46. This is the low temperature configuration of valve 150, i.e. where the temperature of the fluid is below a predetermined temperature.

Once the fluid in heat exchanger 10 reaches the predetermined temperature, the increased temperature is sensed by the temperature sensor 90 and is communicated to the electrical control unit 92 through leads 152. The electrical control unit 92 in turn causes the solenoid coil 82 to become energized with power supplied through power supply leads 162, 164. When the solenoid is energized, the hollow actuator shaft 84 is extended to the closed position shown in FIG. 11 so that plunger 86 blocks flow between the housing inlet and outlet openings 44, 46, thereby preventing bypass flow and causing the fluid to flow through the tubular members 14 of heat exchanger 10. This is the high temperature configuration of valve 150, and in this configuration the temperature sensor 90 communicates with the fluid in heat exchanger 10 through notch or bleed hole 76.

When the temperature signal communicated to the control unit 92 indicates that the temperature of the fluid in heat exchanger 10 has dropped below the predetermined temperature, the electrical control unit 92 causes the solenoid coil 82 to become de-energized, and the plunger 86 and actuator shaft 84 are then pushed by spring 88 back to the open position shown in FIG. 10, in which the plunger 86 no longer blocks flow between the inlet and outlet openings 44, 46 so as to permit bypass flow.

The above description describes simple on/off operation of valve 150. It will however be appreciated that the operation of valve 150 could instead be controlled to provide variable opening. For example, once the temperature of the fluid reaches a first predetermined temperature, the actuator shaft could be partially extended so that the plunger 86 moves from the fully open position as shown in FIG. 10 to a position at which it partially blocks the inlet and outlet openings 44, 46 (inbetween the positions shown in FIGS. 10 and 11), thereby reducing but not stopping the bypass flow through the heat exchanger 10. Once the temperature reaches a second predetermined temperature, higher than the first predetermined temperature, the plunger 86 is fully extended to the closed position shown in FIG. 11, and the inlet and outlet openings 44, 46 are completely blocked.

FIG. 12 illustrates a heat exchange circuit 170 including a heat exchanger 172 and a preferred four-port bypass valve 174 according to the invention. Any type of heat exchanger can be used with this embodiment of the present invention. A typical two pass heat exchanger is shown in FIG. 12 and has a first manifold 176, which could be an inlet or an outlet manifold, a return manifold 178 and a second manifold 180. A plurality of spaced-apart heat exchange tubes 182, 184 are connected between the manifolds such that, where first manifold 176 is an inlet manifold, fluid flows from the inlet manifold 176 through tubes 182 into return manifold 178 where it reverses direction and comes back through tubes 184 to the second manifold 180, which is now an outlet manifold. The flow direction can be reversed so that second manifold 180 is the inlet manifold and the first manifold 176 is the outlet manifold. It will also be appreciated that heat exchanger 172 could be modified to become a single pass heat exchanger with manifolds 176, 180 located at respective ends of the heat exchanger.

Where first manifold 176 is an inlet manifold, it is formed with an inlet opening 186 and an inlet conduit 188 is connected to communicate with the inlet opening 186. In this arrangement, the second manifold 20 is the outlet manifold, and is formed with an outlet opening 190, and an outlet conduit 192 is connected to communicate with the outlet opening 190. It will be appreciated, however, that if the flow direction is reversed, the outlet conduit 192 becomes the inlet conduit and inlet conduit 188 becomes the outlet conduit. Conduits 188, 192 are connected to inlet and outlet ports of the bypass valve 174, as will be described further below. Similarly, supply conduits 194, 196 are also connected to ports in bypass valve 174, as will be described below. Supply conduits 194, 196 have end fittings 198, 200 for attachment to flow lines (not shown). Where the heat exchanger 172 is used as a transmission oil cooler, the end fittings 198, 200 can be hose barbs for attaching rubber hoses between the transmission and heat exchange circuit 170. However, any type of end fittings 198, 200 can be used to suit the type of conduits running to and from the heat exchange circuit 170. Bypass valve 174 is referred to as a four port bypass valve because four conduits 188, 192, 194 and 196 are connected to the bypass valve 174.

FIG. 13 is similar to FIG. 12 and similar reference numerals have been used in FIG. 13 and subsequent figures to indicate components that correspond to those of the embodiment shown in FIG. 12. However, the heat exchange circuit 202 of FIG. 13 has a three-port bypass valve 204 which has a single conduit 205 through which it communicates with conduits 188 and 196, the purpose of which will be discussed below.

Figure 14:
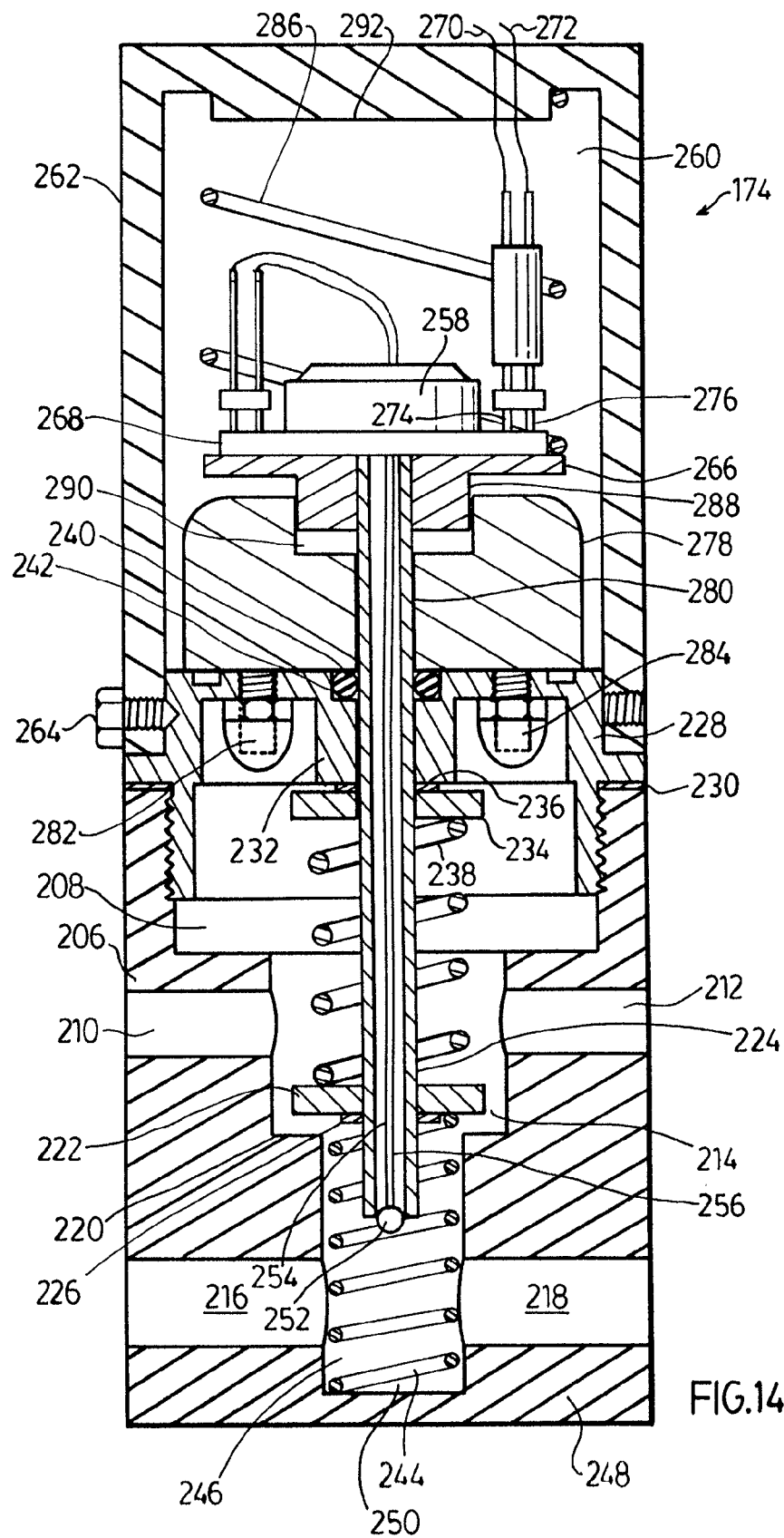
FIG. 14 is a cross-section along line 14-14 of FIG. 12 showing the four-port bypass valve in the open position.
Figure 15:
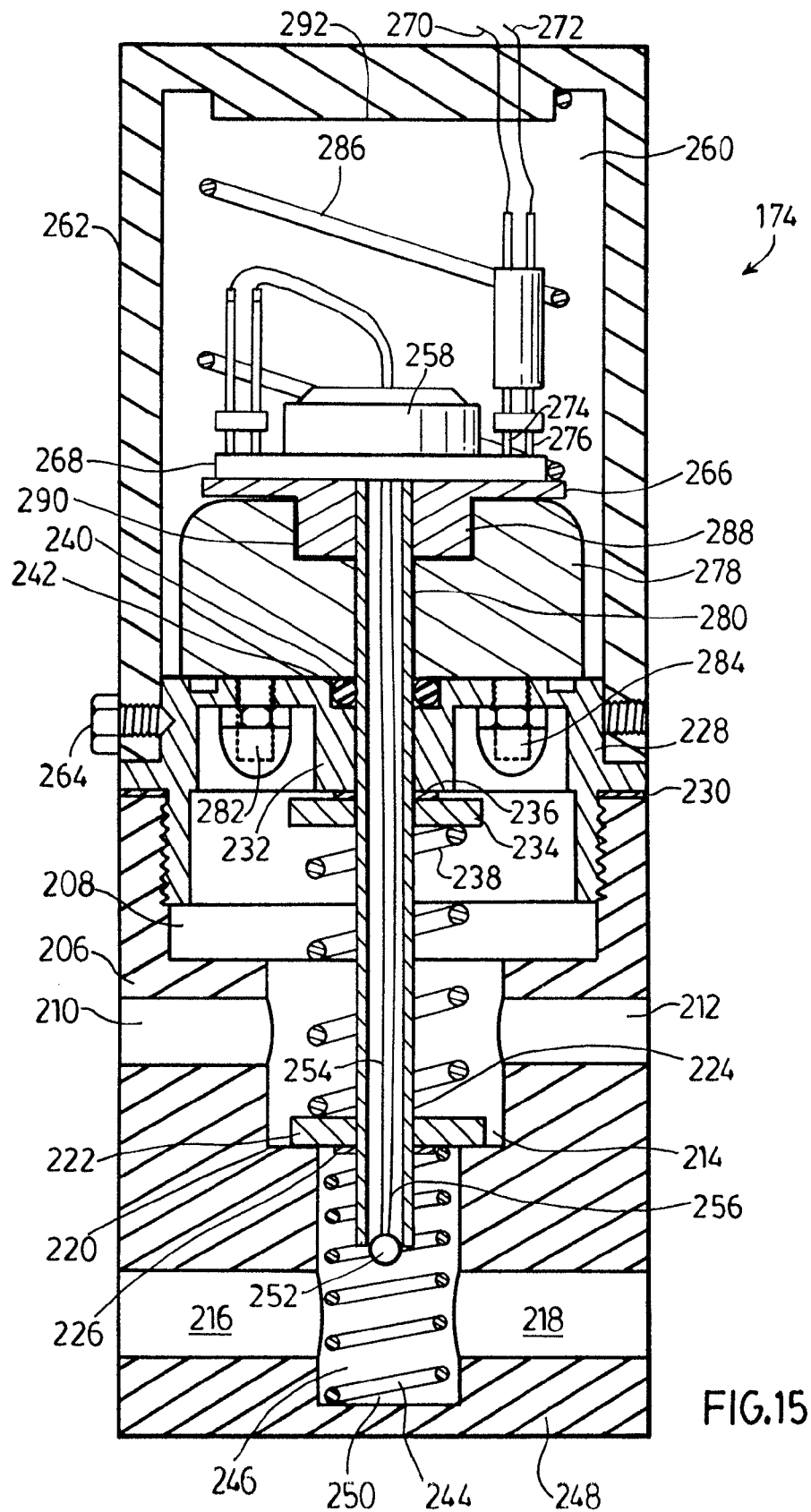
FIG. 15 is a cross-sectional view similar to FIG. 14, but showing the four-port bypass valve of FIG. 14 in the closed position.

FIGS. 14 and 15 provide additional detail regarding the structure of the four port bypass valve 174. Four port valve 174 has a valve housing 206 defining a valve chamber 208 therein. The housing 206 has three main ports or openings 210, 212 and 214. Main ports 210 and 212 are connected to conduits 192 and 194 (FIG. 12). Main port 214, also referred to as a valve port, communicates with two lower branch ports 216, 218 to which conduits 188 and 196 (FIG. 12) are connected, respectively.

The valve port 214 has a peripheral valve seat 220 facing chamber 208, and a movable valve member 222 for opening and closing the valve port 214.

The valve member 222 is in the form of an annular ring which is slidably mounted proximate to a first end of a hollow valve shaft 224. In the orientation of four port valve 174 shown in FIGS. 14 and 15, the first end of the valve shaft 224 is its lower end. Movement of valve member 222 toward the first end of the valve shaft 224 is limited by a retaining ring 226 received on the valve shaft 224 proximate to its first end.

The valve 214 further comprises a valve cover 228 which is sealed to the housing 206, for example by a gasket 230. The valve cover 228 has a central apertured boss 232 through which the second (upper) end of the valve shaft 224 extends. Spaced from the valve member 222 toward the second end of valve shaft 224 are provided an annular washer 234 slidably received on the valve shaft 224 and a retaining ring 236 attached to the shaft 224 to limit movement of the washer 234 toward the second end of the shaft 224. A coil override spring 238 surrounds the valve shaft 224 and bears against the washer 234 and the valve member 222 to urge them into engagement with retaining rings 236, 226, respectively. A seal is formed between the valve cover 228 and the valve shaft 224 by an O-ring 240 which is provided in an annular groove 242 surrounding the central aperture of the valve cover 228.

A return spring 244 is received in a bore 246 extending between the valve chamber 208 and the branch ports 216, 218, thereby providing communication between branch ports 216, 218 and valve chamber 208 through the valve port 214. The bore 246 extends into the bottom wall 248 of the housing 206, forming a circular depression 250 therein. As shown in the drawings, the first end of the valve shaft 224 extends partway into the bore 246. The coil return spring 244 extends between the depression 250 in the bottom wall 248 and the valve member 222 and urges the valve member out of engagement with the valve seat 220, i.e. toward the open position shown in FIG. 14.

A temperature sensor 252 is provided at the second end of the valve shaft 224 for sensing the temperature of fluid flowing through the branch ports 216, 218 and the bore 246. The temperature sensor 252 may preferably be a thermistor. Temperature information from the sensor 252 is communicated via a pair of sensor leads 254, 256 which extend through the hollow interior of the valve shaft 224 between its first and second ends. The sensor leads 254, 256 convey temperature information from the sensor 252 to an electrical control unit 258 which is housed in a control unit compartment 260. The compartment 260 is housed inside a cap 262 which is secured to valve cover 228 by any suitable means, such as set screws 264 as illustrated in FIG. 14. The control unit 258 may preferably be attached to a plunger plate 266 which is attached to the second end of the valve shaft 224, and which has an upper surface on which the control unit 258 is provided. The control unit 258 may preferably include a circuit board 268 to which the temperature sensor leads 254, 256 and power supply leads 270, 272 are connected through appropriate connectors 274, 276.

The control unit 258 controls the operation of a solenoid 278 having a central bore 280 through which the valve shaft 224 extends. The solenoid 278 may preferably be provided with studs 282, 284 through which it is secured to the valve cover 228. The solenoid 278 may preferably have an annular depression 290 in its upper surface into which a boss 288 of the plunger plate 266 extends. When the solenoid 278 becomes energized by the control unit 258, the valve shaft 224 is caused to move downwardly relative to the solenoid. Engagement of the plunger plate 266 and the solenoid 278 provides a stop which limits the downward movement of the shaft 224.

Although not required, a coil spring 286 may be provided in the control unit compartment 260. In the embodiment shown in FIGS. 14 and 15, one end of the coil spring engages the plunger plate while the other end engages an internal boss 292 in the cap 262.

The operation of bypass valve 174 will now be described with reference to FIGS. 12, 14 and 15. Heat exchange circuit 170 can be operated with either conduit 194 or 196 being the inlet conduit, the other one being the outlet conduit. Where conduit 194 is the inlet conduit and receives transmission oil from the transmission (not shown), this is referred to as "normal flow". In this case, conduit 196 is the outlet conduit and returns the transmission oil to the transmission. Where, on the other hand, the conduit 196 is the inlet conduit receiving the transmission oil from the transmission and conduit 194 is the outlet or return conduit for delivering the oil back to the transmission, this configuration referred to as "reverse flow".

Dealing first with the normal flow configuration, where the temperature of the oil is lower than a predetermined temperature, such as at engine start-up conditions, the oil may be too viscous to flow through heat exchanger 172 and it is therefore necessary to bypass the heat exchanger 172. Under these conditions, the valve 174 is in the open configuration with the solenoid 278 de-energized as shown in FIG. 14. The hot transmission oil flowing through the inlet conduit 194 enters the valve 174 through port 212, and enters the valve chamber 208. The oil then flows through the open valve port 214, passing through a gap between the valve element 222 and the valve seat 220, into the bore 246 and then exits the valve 174 through the branch port 218. As the oil flows through bore 246 it comes into contact with temperature sensor 252.

Once the sensor 252 detects that the oil temperature has reached the predetermined temperature, and conveys this information to the control unit 258, the control unit 258 energizes the solenoid 278 which causes the valve shaft 224 to extend downwardly until the valve element 222 is brought into sealed engagement with the valve seat 220. In this configuration, shown in FIG. 15, the valve port 214 is closed and bypass flow is prevented. Thus, when the oil reaches the desired operating temperature, full flow is occurring through heat exchanger 172 and bypass flow has been discontinued.

With the valve 174 in the closed configuration shown in FIG. 15, the hot transmission oil flowing through inlet conduit 194 enters the valve 174 through port 212, flows through valve chamber 208 and exits the valve 174 through valve port 210. The hot oil then flows through the conduit 192 and into the inlet manifold 180 of heat exchanger 172. The hot oil is cooled as it passes through heat exchanger 172 and exits the heat exchanger 172 through outlet conduit 188, which is connected to the outlet manifold 186. The cooled oil flows then enters the valve 174 through branch port 216, passes through bore 246 and exits the valve through branch port 218. The cooled oil then flows back to the transmission through outlet conduit 196.

If the transmission oil returning to the transmission drops below the predetermined temperature, the control unit 258 de-energizes the solenoid, thereby causing the return spring 244 to lift the valve member out of engagement with the valve seat 220. The oil is then permitted to bypass the heat exchanger 172 as described above.

In the reverse flow configuration, conduit 196 becomes the inlet conduit receiving hot oil from the transmission, and conduit 194 becomes the outlet conduit returning the cooled transmission oil to the transmission. In the reverse configuration, the flow through the valve 174 is the opposite of that described above, whether the transmission oil is above or below the predetermined temperature.

It will be appreciated that any pressure peaks that might occur upon the closing of valve member 222 are attenuated or modulated, because valve member 222 can lift off valve seat 220 by such a pressure surge, since valve member 222 is urged into position by coil spring 238 and is not solidly in engagement with the valve seat 220. In other words, the coil spring 238 can absorb pressure spikes in the inlet conduits 196, 188 so that they do not travel back and adversely affect the transmission.

Another advantage of bypass valve 174 is that the temperature sensor 252 is located such that it is in continuous contact with oil flowing through the valve 174. Thus, the temperature sensor can respond quickly to changes in the oil temperature.

Figure 16:
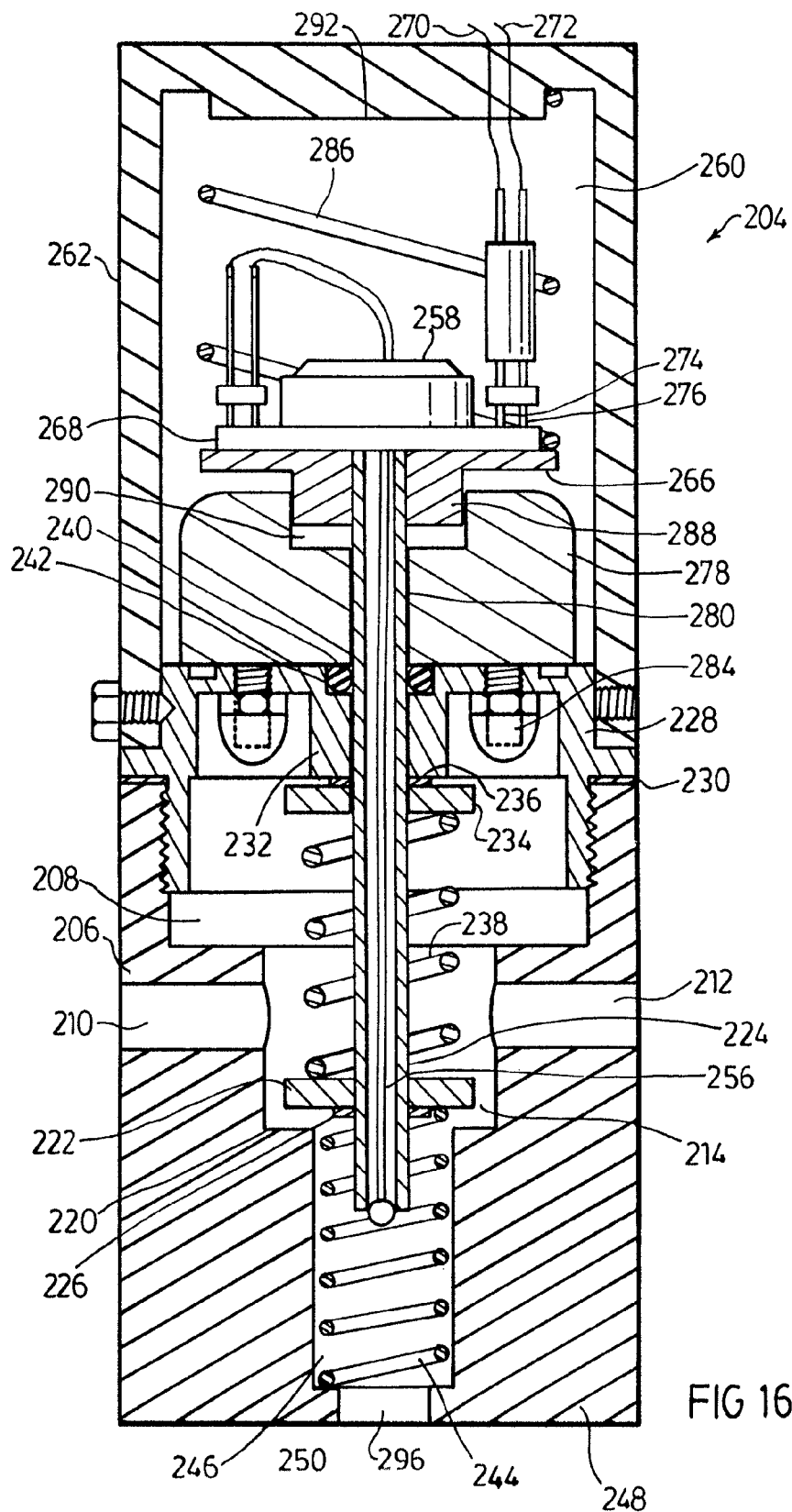
FIG. 16 is a cross-section along line 16-16 of FIG. 13 showing the three-port bypass valve in the open position.
Figure 17:
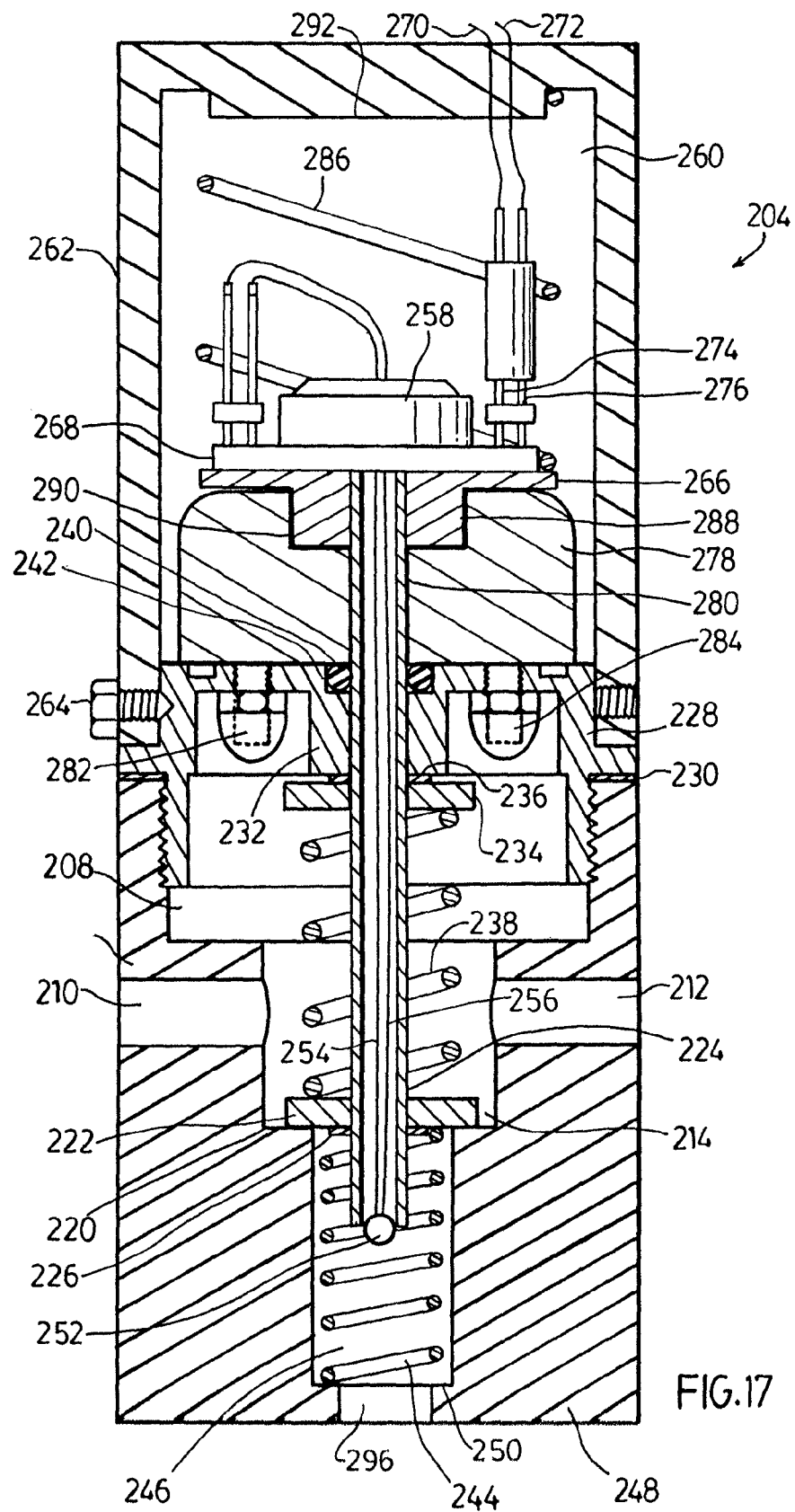
FIG. 17 is a cross-sectional view similar to FIG. 16, but showing the three-port bypass valve of FIG. 14 in the closed position.

Referring next to FIGS. 13, 16 and 17, three-port bypass valve 204 will now be described in detail. Bypass valve 204 is similar to bypass valve 174 includes a number of components which are either similar or identical to components of the four-port bypass valve 174 described above. Similar reference numerals are used to describe similar elements of valve 204 and detailed description of these elements is omitted.

The principal difference between valve 204 and valve 174 is that valve 204 has a valve housing 294 provided with a single branch port 296 rather than a pair of branch ports 216, 218 as in valve 174. The valve housing 294 is otherwise the same as the valve housing 206 of valve 174. The single branch port 296 is connected to conduits 188 and 196 through the conduit 205. The operation of valve 204 is substantially the same as described above with reference to valve 174, except that the transmission oil enters or exits the valve 204 through the single branch port 296, depending on whether the oil flow is in the normal or reverse direction.

Figure 18:
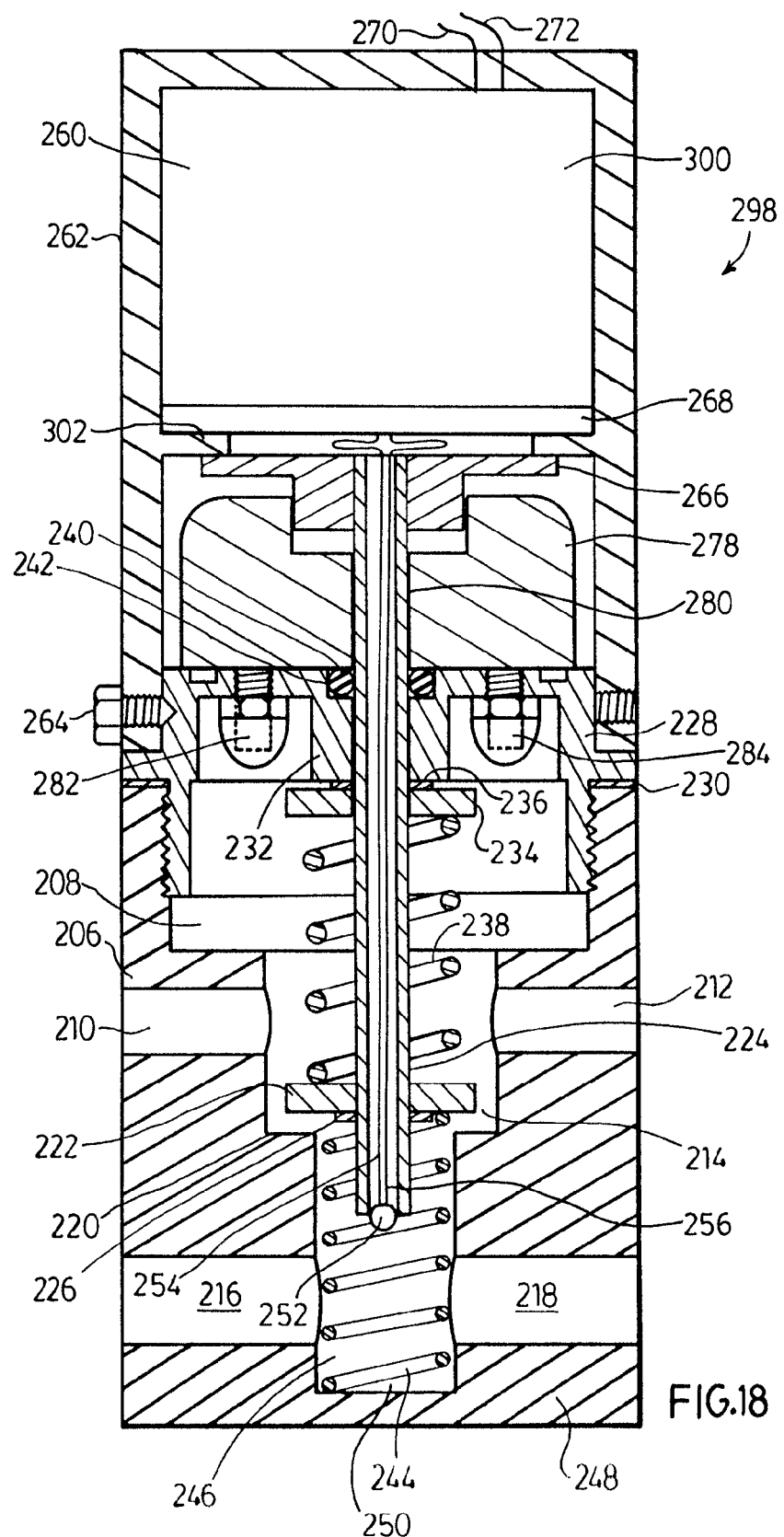
FIG. 18 is a cross-sectional view of a four-port bypass valve according to another embodiment of the present invention.

In each of the valves illustrated in FIGS. 10 to 17, the electrical control unit is attached to the valve shaft so that the control unit and the valve shafts move together during operation of the valve. FIG. 18 illustrates four-port bypass valve 298, similar to valve 174 shown in FIG. 14, having an electrical control unit 300 which is spaced from the valve shaft and is housed in the control unit compartment 260 which is separated from the remainder of the valve 298 by an annular flange 302 extending inwardly from the side wall of the cap 262. In this embodiment there is no spring inside the cap 262. The remaining elements of valve 298 are identical to the elements of valve 174 and are identified by like reference numerals. Also, the operation of valve 298 is substantially identical to the operation of valve 174. Therefore, a detailed description of the elements of valve 298, and their operation, are unnecessary.

As will be apparent to those skilled in the art in the light of the foregoing disclosure, many alterations and modifications are possible in the practice of this invention without departing from the spirit or scope thereof. The foregoing description is of the preferred embodiments and is by way of example only, and it is not to limit the scope of the invention.

What is claimed is:

1. A bypass valve for a heat exchanger, comprising:
   (a) a housing comprising:
      (i) a first opening and a second opening to permit fluid to flow through the valve;
      (ii) a first valve chamber which is arranged between the first and second openings and is in flow communication with both the first and second openings;
      (iii) a second valve chamber in flow communication with the first valve chamber;
      (iv) a third opening in communication with the second valve chamber; and
      (v) a valve port which is arranged between the first and second valve chambers, wherein the second valve chamber is arranged between the third opening and the valve port; and
   (b) a temperature-responsive actuator mounted in the housing and comprising:
      (i) a reciprocating sealing member extending into the first valve chamber;
      (ii) a solenoid having a central actuator shaft attached to the sealing member, wherein the actuator shaft extends upon energization of the solenoid, so that the sealing member seals the valve port and blocks flow between the first and second valve chambers, wherein the actuator shaft has a first end to which the sealing member is attached, a second end, and a hollow interior;
      (iii) bias means for urging the actuator shaft to retract upon de-energization of the solenoid so as to unblock flow between said inlet and outlet openings; and
      (iv) a temperature sensor for sensing a temperature of the fluid flowing through the valve, the temperature sensor being electrically coupled to the solenoid through one or more conductors, wherein the temperature sensor is located at the first end of the actuator shaft and the one or more conductors extend through the hollow interior of the actuator shaft to the second end thereof.

2. The bypass valve according to claim 1, further comprising an electrical control unit mounted in the housing and electrically connected between the temperature sensor and the solenoid for controlling the movement of the sealing member in accordance with the temperature sensed by the temperature sensor.

3. The bypass valve according to claim 2, wherein the second end of the actuator shaft extends through the solenoid and is provided with a plunger plate to which the electrical control unit is mounted.

4. The bypass valve according to claim 2, wherein the housing further comprises a control unit compartment in which electrical control unit is housed.

5. The bypass valve according to claim 1, wherein the temperature sensor is a thermistor mounted on the first end of the actuator shaft.

6. The bypass valve according to claim 1, wherein the actuator shaft and the first and second valve chambers are aligned along a common axis, and wherein the biasing means comprises a coil spring housed in the second valve chamber.

7. The bypass valve according to claim 1, wherein the housing further comprises a fourth opening which is in flow communication with the second valve chamber, and wherein the second valve chamber is arranged between the third and fourth openings.

8. The bypass valve according to claim 1, wherein the housing includes a valve cover which closes the first valve chamber and which has a central opening through which the actuator shaft extends, wherein the solenoid is mounted to the valve cover.

* * * * *